(12) United States Patent
Shimizu

(10) Patent No.: US 9,031,757 B2
(45) Date of Patent: May 12, 2015

(54) BRAKE CONTROL APPARATUS

(71) Applicant: Hitachi Automotive Systems, Ltd., Hitachinaka-shi, Ibaraki (JP)

(72) Inventor: Makoto Shimizu, Chigasaki (JP)

(73) Assignee: Hitachi Automotive Systems, Ltd., Hitachinaka-Shi (JP)

( * ) Notice: Subject to any disclaimer, the term of this patent is extended or adjusted under 35 U.S.C. 154(b) by 0 days.

(21) Appl. No.: 14/176,411

(22) Filed: Feb. 10, 2014

(65) Prior Publication Data

US 2014/0257658 A1    Sep. 11, 2014

(30) Foreign Application Priority Data

Mar. 5, 2013   (JP) ................................ 2013-042514

(51) Int. Cl.
| | |
|---|---|
| *G06F 7/70* | (2006.01) |
| *B60T 8/17* | (2006.01) |
| *B60T 8/172* | (2006.01) |
| *B60T 8/1755* | (2006.01) |

(52) U.S. Cl.
CPC .. *B60T 8/17* (2013.01); *B60T 8/172* (2013.01); *B60T 8/1755* (2013.01)

(58) Field of Classification Search
None
See application file for complete search history.

(56) References Cited

U.S. PATENT DOCUMENTS 8,348,352 B2   1/2013   Nishino et al.

FOREIGN PATENT DOCUMENTS

JP   2009-045982 A   3/2009

*Primary Examiner* — Calvin Cheung
(74) *Attorney, Agent, or Firm* — Foley & Lardner LLP

(57) ABSTRACT

A brake control apparatus includes a booster configured to increase a driver's operation force on a brake operation member to generate a hydraulic pressure in a master cylinder, a booster state detection unit configured to detect a state of the booster and transmit a corresponding signal, a hydraulic control device configured to control a hydraulic pressure in a wheel cylinder to which the hydraulic pressure from the master cylinder is supplied, a hydraulic controller configured to control the hydraulic control device, first and second communication lines arranged in parallel with each other for transmitting the signal to the hydraulic controller, and a booster unsteady state determination unit provided in the hydraulic controller and configured to determine whether the booster is in an unsteady state based on communication states of the signals transmitted via the first and second communication lines.

23 Claims, 20 Drawing Sheets

BRAKE CONTROL APPARATUS

BACKGROUND OF THE INVENTION

The present invention relates to a brake control apparatus.

Brake control apparatuses transmit an unsteady state of an electric booster to a controller via a single communication line, thereby performing backup control by the controller. Japanese Patent Application Public Disclosure No. 2009-45982 discusses an example of the above-described technique.

SUMMARY OF INVENTION

There is a need for improving the accuracy with which the above-described related technique determines whether the booster is in an unsteady state.

An object of the present invention is to provide a brake control apparatus capable of improving the accuracy with which the brake control apparatus determines whether a booster is in an unsteady state.

According to an aspect of the present invention, a brake control apparatus includes a booster configured to increase an operation force exerted by a driver on a brake operation member to generate a hydraulic pressure in a master cylinder, a booster state detection unit configured to detect a state of the booster and transmit a corresponding signal, a hydraulic control device configured to control a hydraulic pressure in a wheel cylinder to which the hydraulic pressure from the master cylinder is supplied, a hydraulic controller configured to control the hydraulic control device, a first communication line configured to be used to transmit the signal to the hydraulic controller, a second communication line arranged in parallel with the first communication line and configured to be used to transmit the signal to the hydraulic controller, and a booster unsteady state determination unit provided in the hydraulic controller and configured to determine whether the booster is in an unsteady state based on communication states of the signals transmitted via the first communication line and the second communication line.

DESCRIPTION OF EMBODIMENTS

Figure 1:
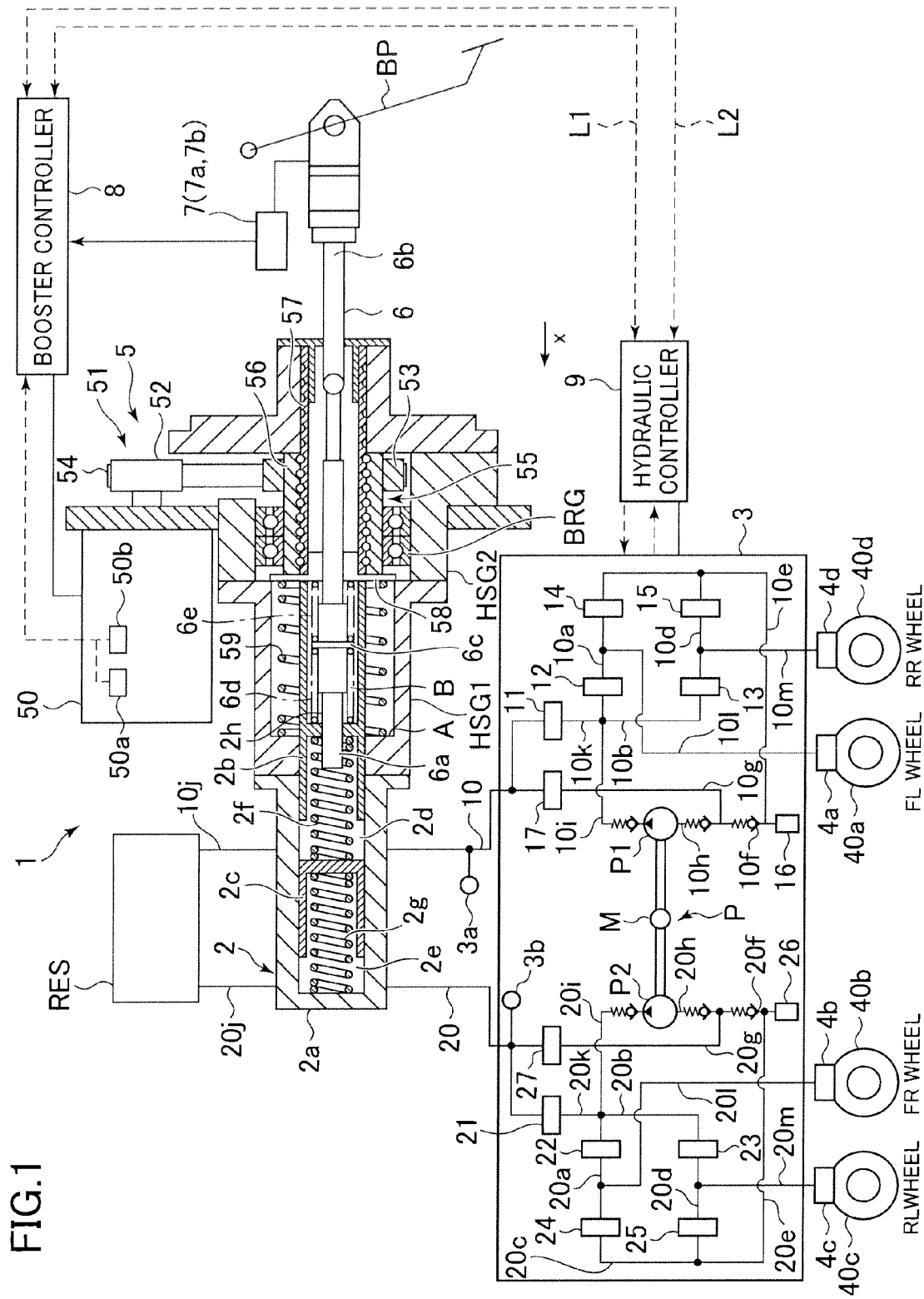
FIG. 1 illustrates an overall configuration of a brake control apparatus.

Hereinafter, modes for carrying out a brake control apparatus according to the present invention will be described based on embodiments illustrated in the drawings.

The embodiments that will be described below have been contrived so as to satisfy a number of needs, one of which is improving the accuracy of determining whether a booster is in an unsteady state. The embodiments that will be described below further satisfy a need for detecting an abnormality in an operation of the booster, in addition to reliably obtaining a required brake force even in the unsteady state.

The unsteady state of the booster is defined to include a communication abnormal state such as a break and short-circuiting of a communication line for transmitting operation states of the booster and a booster controller in addition to abnormal states of the booster and the booster controller.

First Embodiment

First, a configuration of a brake control apparatus will be described.

[Configuration of Brake Control Apparatus]

FIG. 1 illustrates an overall configuration of a brake control apparatus 1 according to a first embodiment. An FL wheel is a front left wheel. An FR wheel is a front right wheel. An RL wheel is a rear left wheel. An RR wheel is a rear right wheel. Further, arrowed broken lines represent signal lines, and signal flows are indicated by the directions of the arrows.

The brake control apparatus 1 includes a master cylinder 2, a reservoir tank RES, a hydraulic control device 3, wheel cylinders 4a to 4d mounted on the respective wheels FL, FR, RL, and RR, an electric booster 5 and an input rod 6 disposed connectedly to the master cylinder 2, a stroke sensor 7, a booster controller 8 that controls the electric booster 5, and a hydraulic controller 9 that controls the hydraulic control device 3.

The input rod 6 increases and reduces a hydraulic pressure in the master cylinder 2 (hereinafter referred to as a master cylinder hydraulic pressure Pmc) together with a brake pedal (a brake operation member) BP. The electric booster 5 and the booster controller 8 increase and reduce the master cylinder hydraulic pressure Pmc together with a primary piston 2b in the master cylinder 2.

Hereinafter, for convenience of description, an axial direction of the master cylinder 2 is set as an X axis, and a direction toward the brake pedal BP is defined as a negative direction. The master cylinder 2 is a so-called tandem type master cylinder, and includes the primary piston 2b and a secondary piston 2c within a cylinder 2a. A primary hydraulic chamber 2d is defined as a pressurization chamber among an inner circumferential surface of the cylinder 2a, an end surface of the primary piston 2b in a positive direction of the X axis, and an end surface of the secondary piston 2c in the negative direction of the X axis. A secondary hydraulic chamber 2e is defined as a pressurization chamber between the inner circumferential surface of the cylinder 2a and an end surface of the secondary piston 2c in the positive direction of the X axis.

The primary hydraulic chamber 2d is communicably connected to a brake circuit 10, and the secondary hydraulic chamber 2e is communicably connected to a brake circuit 20. A volume of the primary hydraulic chamber 2d is changed according to sliding movements of the primary piston 2b and the secondary piston 2c within the cylinder 2a. A return spring 2f, which biases the primary piston 2b in the negative direction of the X axis, is disposed in the primary hydraulic chamber 2d. A volume of the secondary hydraulic chamber 2e is changed according to a sliding movement of the secondary piston 2c within the cylinder 2a. A return spring 2g, which biases the secondary piston 2c in the negative direction of the X axis, is disposed in the secondary hydraulic chamber 2e.

One end 6a of the input rod 6 in the positive direction of the X axis is located within the primary hydraulic chamber 2d through a partition wall 2h of the primary piston 2b. The one end 6a of the input rod 6 and the partition wall 2h of the primary piton 2b are sealed therebetween so that liquid-tightness is maintained therebetween, and the one end 6a is disposed slidably in the X axis direction relative to the partition wall 2h. On the other hand, an opposite end 6b of the input rod 6 in the negative direction of the X axis is coupled to the brake pedal BP. When the brake pedal BP is pressed, the input rod 6 moves in the positive direction of the X axis. When the brake pedal BP is returned, the input rod 6 moves in the negative direction of the X axis.

Hydraulic fluid in the primary hydraulic chamber 2d is pressurized according to an advancement of the input rod 6 and/or the primary piston 2b (driven by a driving motor 50) in the positive direction of the X axis. The pressurized hydraulic fluid is supplied into the hydraulic control device 3 via the brake circuit 10. Further, the secondary piston 2c advances in the positive direction of the X axis by the pressure in the pressurized primary hydraulic chamber 2d. Hydraulic fluid in the secondary hydraulic chamber 2e is pressurized by the above-described advancement of the secondary piston 2c, and is supplied into the hydraulic control device 3 via the brake circuit 20.

In this manner, the brake control apparatus 1 is configured in such a manner that the input rod 6 moves according to a movement of the brake pedal BP to pressurize the primary hydraulic chamber 2d, whereby the master cylinder hydraulic pressure Pmc can be increased by a driver's brake operation to reliably obtain a predetermined brake force even when the driving motor 50 stops due to a failure. Further, a force according to the master cylinder hydraulic pressure Pmc is applied to the brake pedal BP via the input rod 6 to be transmitted to the driver as a brake pedal reaction force, thereby eliminating the necessity of a device for generating the brake pedal reaction force such as a spring, which would otherwise become necessary in another configuration. Therefore, the brake control apparatus can be reduced in size and weight, improving its mountability to a vehicle.

The stroke sensor (a stroke detection unit) 7, which detects a stroke of the brake pedal BP, is disposed adjacent to the opposite end 6b of the input rod 6. The stroke sensor 7 is a displacement sensor that detects a displacement amount of the input rod 6 in the X axis direction. In the first embodiment, two displacement sensors 7a and 7b are provided as the stroke sensor 7, and displacement amounts detected thereby are input into the booster controller 8, respectively. Combined use of a plurality of displacement sensors in this manner can ensure a fail-safe mechanism because a brake request from the driver can be detected and recognized by a remaining sensor even when a signal from one sensor is lost due to a failure.

The reservoir tank RES includes at least two hydraulic chambers divided from each other by a partition wall. The respective hydraulic chambers are communicably connected to the primary hydraulic chamber 2d and the secondary hydraulic chamber 2e of the master cylinder 2 via a brake circuit 10j and a brake circuit 20j, respectively.

The hydraulic control device 3 is a hydraulic control device capable of realizing ABS control, vehicle movement stabilization control, and the like. The hydraulic control device 3 supplies the hydraulic fluid pressurized by the master cylinder 2 and the like to the respective wheel cylinders 4a to 4d according to a control instruction from the hydraulic controller 9.

The wheel cylinders 4a to 4d each are embodied by a known wheel cylinder that includes a cylinder, a piston, pads, and the like, and is configured to advance the piston by the hydraulic fluid supplied from the hydraulic control device 3 to press the pads coupled with this piston against a disk rotor 40a, 40b, 40c, or 40d. The disk rotors 40a to 40d rotate integrally with the wheels FL, FR, RL, and RR, respectively. A brake torque applied to each of the disk rotors 40a to 40d serves as a brake force applied between each of the wheels FL, FR, RL, and RR, and a road surface.

The electric booster 5 controls the displacement amount of the primary piston 2b, thus, the master cylinder hydraulic pressure Pmc according to a control instruction from the booster controller 8. The electric booster 5 includes the driving motor 50, a speed reducer 51, and a rotation-translation converter 55.

The booster controller 8 is a calculation processing circuit, and controls an operation of the driving motor 50 based on sensor signals and the like from the stroke sensor 7 and the driving motor 50.

The hydraulic controller 9 is a calculation processing circuit, and calculates a target brake force that should be generated at each of the wheels FL, FR, RL, and RR based on a distance to a preceding car, road information, and a vehicle state amount (for example, a yaw rate, a longitudinal acceleration, a lateral acceleration, a steering angle of a steering wheel, a wheel speed, and a speed of a vehicle body). Then, the hydraulic controller 9 controls an operation of each actuator (a solenoid valve and a pump) of the hydraulic control device 3 based on this calculation result.

The booster controller 8 and the hydraulic controller 9 are communicably connected via communication lines L1 and L2 of two systems.

[Hydraulic Control Device]

In the following description, a hydraulic circuit configuration of the hydraulic control device 3 will be described.

The brake circuit includes independent two brake systems, and is divided into a primary system and a secondary system. The primary system receives supply of the hydraulic fluid from the primary hydraulic chamber 2d, and controls a brake force at each of the wheels FL and RR via the brake circuit 10. The secondary system receives supply of the hydraulic fluid from the secondary hydraulic chamber 2e, and controls a brake force at each of the wheels FR and RL via the brake circuit 20. The brake circuit has a so-called X-shaped piping configuration in this manner. Therefore, even when a failure occurs in one of the brake systems, brake forces can be reliably obtained for diagonal two wheels by another normal brake system, maintaining a stable movement of the vehicle. Hereinafter, the hydraulic control device 3 will be described based on the primary system by way of example.

An out-side gate valve 11 is disposed between a master cylinder side (hereinafter referred to as an upstream side) of the brake circuit 10 and a wheel cylinder side (hereinafter referred to as a downstream side) of the brake circuit 10. The out-side gate valve 11 is opened when the hydraulic fluid pressurized by the master cylinder 2 is supplied to the wheel cylinders 4a and 4d.

A downstream side of a brake circuit 10K where the out-side gate valve 11 is disposed is diverges into brake circuits 10a and 10b. The brake circuits 10a and 10b are connected to the wheel cylinders 4a and 4d via brake circuits 10l and 10m, respectively. Pressure increase valves 12 and 13 are disposed in the brake circuits 10a and 10b, respectively. The pressure increase valves 12 and 13 are opened when the hydraulic fluid pressurized by the master cylinder 2 or a pump P, which will be described below, is supplied to the wheel cylinders 4a and 4d.

Return circuits 10c and 10d are connected to the brake circuits 10a and 10b on the downstream side of the pressure increase valves 12 and 13, respectively. Pressure reduction valves 14 and 15 are disposed in the return circuits 10c and 10d, respectively. The pressure reduction valves 14 and 15 are opened to reduce pressures in the wheel cylinders 4a and 4d (each of which will be hereinafter referred to as a wheel cylinder hydraulic pressure Pwc). The return circuits 10c and 10d are joined to form a return circuit 10e. The return circuit 10e is connected to a reservoir 16.

On the other hand, the brake circuit 10 diverges on the upstream side of the out-side gate valve 11 to form a suction circuit 10g. An in-side gate valve 17, which switches communication and discommunication between the brake circuit 10 and the suction circuit 10g, is disposed in the suction circuit 10g. The in-side gate valve 17 is opened to, for example, increase the pressure of the hydraulic fluid pressurized by the master cylinder 2 by the pump p, which will be described below, and supply it to the wheel cylinders 4a and 4d. The suction circuit log is joined with the return circuit 10f extending from the reservoir 16 to form a suction circuit 10h.

The pump p, which sucks and discharges the hydraulic fluid as a hydraulic source other than the master cylinder 2, is connected to the brake circuit 10. The pump p is a gear-type pump, and includes a first pump P1 and a second pump P2. The pump P increases the master cylinder hydraulic pressure Pmc to supply it to the wheel cylinders 4a and 4d, for example, when a pressure exceeding the hydraulic pressure in the master cylinder 2 is required to perform automatic brake control such as the vehicle movement stabilization control. The first pump P1 is connected to the suction circuit 10h and a discharge circuit 10i, and is connected to the brake circuit 10k thus the pressure increase valves 12 and 13 via the discharge circuit 10i.

A motor M is a DC (direct-current) brushless motor. The pumps P1 and P2 are coupled to an output shaft of the motor M. The motor M operates by power supplied based on a control instruction from the hydraulic controller 9, and drives the pumps P1 and P2.

The out-side gate valve 11, the in-side gate valve 17, the pressure increase valves 12 and 13, and the pressure reduction valves 14 and 15 are electromagnetic valves, which are opened and closed by power supply to a solenoid. A driving current having a strength according to a driving signal output by the hydraulic controller 9 is supplied to the solenoid, thereby controlling a valve opening/closing amount of each valve individually.

The out-side gate valve 11 and the pressure increase valves 12 and 13 are normally opened valves, while the in-side gate valve 17 and the pressure reduction valves 14 and 15 are normally closed valves. This realizes a circuit configuration that can transmit the whole hydraulic fluid pressurized by the master cylinder 2 to the wheel cylinders 4a and 4d even when power supply to any of the valves stops due to a failure, whereby a brake force can be generated as required by the driver. Alternatively, the out-side gate valve 11 and the pressure increase valves 12 and 13 may be normally closed valves while the in-side gate valve 17 and the pressure reduction valves 14 and 15 may be normally opened valves. Which should be normally opened valves or normally closed valve is not especially limited.

The hydraulic circuit of the brake circuit 20 is identically configured to the above-described brake circuit 10.

Master cylinder hydraulic sensors (a master cylinder hydraulic detection unit) 3a and 3b, which are pressure sensors configured to detect the master cylinder hydraulic pressure Pmc (the pressure in the primary hydraulic chamber 2d and the secondary hydraulic chamber 2e), are disposed in the brake circuit 10 (more specifically, between the master cylinder 2 and the hydraulic control device 3) and the brake circuit 20 (more specifically, within the hydraulic control device 3), respectively. Information of the master cylinder hydraulic pressure Pmc detected by the master cylinder hydraulic sensors 3a and 3b is input into the booster controller 8 and the hydraulic controller 9. The number and arranged positions of the master cylinder hydraulic sensors 3a and 3b can be arbitrarily determined in consideration of controllability, fail-safe functionality, and the like.

Next, an operation of the hydraulic control device 3 during brake control will be described.

During normal control, the hydraulic fluid in the master cylinder 2 is supplied to each of the wheel cylinders 4a to 4d via the brake circuits 10 and 20, thereby generating a brake force.

An operation during the ABS control will be described based on the wheel FL by way of example. The hydraulic control device 3 opens the pressure reduction valve 14 connected to the wheel cylinder 4a and closes the pressure increase valve 12 to return the hydraulic fluid in the wheel cylinder 4a to the reservoir 16, thereby reducing the pressure therein. Then, once the wheel FL recovers from a locked state, the hydraulic control device 3 opens the pressure increase valve 12 and closes the pressure reduction valve 14, thereby increasing the pressure therein. At this time, the pump P returns the hydraulic fluid released into the reservoir 16 to the brake circuit 10k.

During automatic brake control such as the vehicle movement stabilization control, the hydraulic control device 3 closes the out-side gate valves 11 and 21 and opens the in-side gate valves 17 and 27. At the same time, the hydraulic control device 3 actuates the pump P to cause the hydraulic fluid to be discharged from the master cylinder 2 to the brake circuits 10k and 20k via the suction circuits 10g, 10h, 20g, and 20h, and the discharge circuits 10i and 20i. Further, the hydraulic control device 3 controls the out-side gate valves 11 and 21 or the pressure increase valves 12, 13, 22, and 23 in such a manner that the wheel cylinder hydraulic pressure Pwc reaches a target pressure according to a required brake force.

(Boosting Control Configuration in Hydraulic Control Device)

When the driver presses the brake pedal, a hydraulic pressure is generated in the master cylinder. Normally, a boosting system includes a mechanism (corresponding to the electric booster 5 and the booster controller 8) for amplifying an axial force (corresponding to a thrust force of the input rod 6) of the brake pedal, thereby generating a high master cylinder hydraulic pressure. However, a failure in this mechanism leads to a difficulty to increase the master cylinder hydraulic pressure.

On the other hand, if the wheel cylinder hydraulic pressure increases compared to the master cylinder hydraulic pressure generated by the driver's pressing force applied onto the brake pedal, this is equivalent to a boosted state. Therefore, a boosting system can be realized by setting a target wheel cylinder hydraulic pressure that is higher by a differential pressure according to a predetermined boosting ratio relative to the master cylinder hydraulic pressure, and achieving such a state that the wheel cylinder hydraulic pressure is maintained at this target wheel cylinder hydraulic pressure. Therefore, the brake control apparatus 1 according to the first embodiment realizes a function of maintaining the above-described differential pressure by causing the hydraulic control device 3 to control the out-side gate valves 11 and 21 (backup control which will be described below).

Next, a boosting control configuration using the hydraulic control device 3 will be described. The hydraulic control device 3 realizes a boosting system by controlling the pump P, the in-side gate valves 17 and 27, and the out-side gate valves 11 and 21. In summary, the hydraulic control device 3 realizes a boosting system by opening the in-side gate valves 17 and 27 to establishes such a state that the pump P can discharge a predetermined hydraulic pressure by driving control of the motor M, and controlling the out-side gate valves 11 and 21 according to a differential pressure. Next, the details of the respective components will be described based on the brake circuit 10 by way of example.

(Regarding Control of Out-Side Gate Valves)

The out-side gate valve 11 includes a coil that generates an electromagnetic attractive force, a movable element that operates according to this electromagnetic attractive force to adjust a valve-opening amount, and a valve body with the brake circuit 10k and the brake circuit 10 connected thereto.

The movable element is subject to a force Fwc that works in a valve-opening direction according to the pressures in the wheel cylinders 4a and 4d, a force Fmc that works in a valve-closing direction according to the master cylinder hydraulic pressure Pmc, and a force Fb that works in the valve-closing direction according to the electromagnetic attractive force.

The out-side gate valve 11 is a normally opened valve, and therefore is actually subject to a force that works in the valve-opening direction by a spring, but the present embodiment is described ignoring it (the present embodiment can be realized by providing an offset value or the like if this force is also taken into consideration).

The movable element stops at a position where these forces are balanced. More specifically, the movable element stops when Fmc, Fb, and Fwc are in a relationship of Fmc+Fb−Fwc=0(Fb=Fwc−Fmc). The movable element moves in the valve-closing direction when Fmc, Pb, and Fwc are in a relationship of Fmc+Fb−Fwc>0(Fb>Fwc−Fmc). The movable element moves in the valve-opening direction when Fmc, Pb, and Fwc are in a relationship of Fmc+Fb−Fwc<0 (Fb<Fwc−Fmc). Because Fmc is a value that correlates with the master cylinder hydraulic pressure Pmc, and Fwc is a value that correlates with the wheel cylinder hydraulic pressure Pwc, a target differential pressure ΔP as a differential pressure between the master cylinder hydraulic pressure Pmc and the wheel cylinder hydraulic pressure Pwc, which should be achieved by the boosting control, correlates to (Fwc−Fmc). On the other hand, the position of the movable element is determined based on whether Pb is larger than (Fwc−Fmc) or smaller than (Fwc−Fmc) as described above. Therefore, the position of the movable element that can achieve the target differential pressure ΔP is automatically determined by setting the electromagnetic attractive force Pb equal to (Fwc−Fmc) corresponding to the target differential pressure ΔP.

The target differential pressure ΔP is set based on the master cylinder hydraulic pressure Pmc detected by the master cylinder hydraulic sensors 3a and 3b, and a target boosting ratio. The hydraulic controller 9 may set the target differential pressure ΔP by receiving a brake operation amount detected by the stroke sensor 7 from the booster controller 8, and using it.

To realize the boosting control with use of the hydraulic control device 3, a high pressure should be generated on the wheel cylinder side relative to the out-side gate valve 11 using the pump P1 and the like so as to set such a state that the wheel cylinder hydraulic pressure Pwc is higher than the master cylinder hydraulic pressure Pmc. At this time, setting the electromagnetic attractive force Fb to a value corresponding to the target differential pressure ΔP can lead to an automatic change in the position of the movable element of the out-side gate valve 11 according to a pressure increase action occurring at the wheel cylinders 4a and 4d, thereby acquiring the target wheel cylinder hydraulic pressure Pwc. For example, when the wheel cylinder hydraulic pressure Pwc is higher than a target value, the movable element moves to a valve-opening side to cause an automatic discharge of the brake fluid in the wheel cylinders 4a and 4d toward the master cylinder 2 to reduce the wheel cylinder hydraulic pressure Pwc until the target differential pressure ΔP is realized. When the wheel cylinder hydraulic pressure Pwc is lower than a target value, the movable element moves to a valve-closing side to cause a discharge of the brake fluid from the master cylinder 2 toward the wheel cylinders 4a and 4d via the in-side gate valve 17 and the pump 1 to increase the wheel cylinder hydraulic pressure Pwc until the target differential pressure ΔP is realized. In other words, the wheel cylinder hydraulic pressure Pwc is automatically controlled to a desired value even without relying on feedback control using a detection sensor of the wheel cylinder hydraulic pressure Pwc and the like.

As a result, it becomes possible to eliminate the necessity of the complicated feedback control, and absorb a control error of the motor M by the out-side gate valve 11. In other words, providing the electromagnetic attractive force Fb corresponding to the target differential pressure ΔP in a feed-forward manner based on the master cylinder hydraulic pressure Pmc corresponding to the driver's pressing force applied onto the brake pedal enables the out-side gate valve 11 to realize the target differential pressure ΔP to exert a function similar to a mechanical feedback mechanism. Therefore, this control does not require, for example, a sensor configured to detect a state of a control target, which otherwise would be necessary for an electronic feedback control mechanism, thereby providing extremely high control stability.

(Regarding Motor Driving Control)

While the out-side gate valve 11 is controlled in the above-described manner, basically, the in-side gate valve 17 is opened and the pump P1 is driven. The pump P1 is driven by the motor M. Therefore, for example, a minimum number of rotations or the like is set so as to realize a discharge pressure capable of supplying the boosted wheel cylinder hydraulic pressure Pwc, which is set according to the master cylinder hydraulic pressure Pmc, and the motor M is driven so as to satisfy the minimum number of rotations. As a result, a required hydraulic pressure can be obtained from the pump 1, whereby the wheel cylinder hydraulic pressure Pwc can be controlled to a desired hydraulic pressure.

As described above, the pump p1 sucks the brake fluid in the master cylinder 2 via the brake circuits 10g and 10h, and discharges it toward the wheel cylinders 4a and 4d. Therefore, the driver's brake pedal stroke can be obtained without requiring a stroke simulator and the like. Further, this control can be performed by only detecting the master cylinder hydraulic pressure Pmc, whereby the boosting system can be realized even when the stroke sensor (the stroke sensor 7) and the like are broken (the backup control that will be described below can be performed).

[Electric Booster]

Next, a configuration and an operation of the electric booster 5 will be described.

The driving motor 50 is a three-phase DC brushless motor, and operates by power supplied based on a control instruction from the booster controller 8 to generate a desired rotational torque.

The speed reducer 51 slows down a rotation output from the driving motor 50 by a pulley reduction method. The speed reducer 51 includes a small-diameter driving-side pulley 52 disposed on an output shaft of the driving motor 50, a large-diameter driven-side pulley 53 disposed at a ball screw nut 56 of the rotation-translation converter 55, and a belt 54 wound around the driving-side and driven-side pulleys 52 and 53. The speed reducer 51 amplifies a rotational torque of the driving motor 50 at a speed reduction ratio (a ratio between radii of the driving-side and driven-side pulleys 52 and 53) to transmit it to the rotation-translation converter 55.

If a rotational torque of the driving motor 50 is sufficiently large so that the torque does not have to be amplified by a speed reduction, the speed reducer 51 may be omitted, and the driving motor 50 and the rotation-translation converter 55 may be directly connected to each other. In this case, it is possible to avoid various problems regarding reliability, tranquility, mountability, and the like, which might occur due to intervention of the speed reducer 51.

The rotation-translation converter 55 converts rotational power of the driving motor 50 into translation power, and presses the primary piston 2b by this translation power. The first embodiment employs a ball screw method as the power conversion mechanism, and the rotation-translation converter 55 includes the ball screw nut 56, a ball screw shaft 57, a movable member 58, and a return spring 59.

A first housing member HSG1 is connected to a portion of the master cylinder 2 in the negative direction of the X axis. A second housing member HSG2 is connected to an end of the first housing member HSG1 in the negative direction of the X axis. The ball screw nut 56 is axially rotatably disposed in an inner circumference of a bearing BRG disposed in the second housing member HSG2. The driven-side pulley 53 is fitted to a portion of an outer circumference of the ball screw nut 56 in the negative direction of the X axis. The hollow ball screw shaft 57 is screwed with an inner circumference of the ball screw nut 56.

A plurality of balls is rotationally disposed in a space between the ball screw nut 56 and the ball screw shaft 57.

The movable member 58 is integrally formed at an end of the ball screw shaft 57 in the positive direction of the X axis. The primary piston 2b is joined to an end surface of the movable member 58 in the positive direction of the X axis. The primary piston 2b is contained in the first housing member HSG1. An end of the primary piston 2b in the positive direction of the X axis protrudes from the first housing member HSG1, and is fitted to an inner circumference of the cylinder 2a of the master cylinder 2.

The return spring 59 is disposed along an outer circumference of the primary piston 2b within the first housing member HSG1. An end of the return spring 59 in the positive direction of the X axis is fixed to a surface A in the first housing member HSG1 in the positive direction of the X axis, while an end of the return spring 59 in the negative direction of the X axis is engaged with the movable member 58. The return spring 59 is disposed while being pressed to be compressed in the X axis direction between the surface A and the movable member 58, and biases the movable member 58 and the ball screw shaft 57 in the negative direction of the X axis.

When the driven-side pulley 53 rotates, the ball screw nut 56 rotates integrally. This rotational movement of the ball screw nut 56 causes a translation movement of the ball screw shaft 57 in the X axis direction. A thrust force from the translation movement of the ball screw shaft 57 in the positive direction of the X axis presses the primary piston 2b in the positive direction of the X axis via the movable member 58. FIG. 1 illustrates the primary piston 2b at an initial position where the ball screw shaft 57 is maximally displaced in the negative direction of the X axis when the vehicle is not braked.

On the other hand, an elastic force of the return spring 59 is applied onto the ball screw shaft 57 in a direction (in the negative direction of the X axis) opposite from the above-described thrust force in the positive direction of the X axis. Therefore, even if the driving motor 50 stops due to a failure to disable return control of the ball screw shaft 57 during braking, i.e., when the primary piston 2b is pressed in the positive direction of the X axis to pressurize the master cylinder hydraulic pressure Pmc, the ball screw shaft 57 is returned to the initial position by a reaction force of the return spring 59. As a result, the master cylinder hydraulic pressure Pmc reduces to around zero, thereby preventing a brake force from dragging to avoid such a situation that the vehicle might have an instable movement due to this dragging.

Further, a pair of springs 6d and 6e is disposed in an annular space B defined between the input rod 6 and the primary piston 2b. Respective one ends of the pair of springs 6d and 6e are engaged with a flange portion 6c formed at the input rod 6. An opposite end of the spring 6d is engaged with the partition wall 2h of the primary piston 2b, and an opposite end of the spring 6e is engaged with the movable member 58. The pair of springs 6d and 6e has a function of biasing the input rod 6 relative to the primary piston 2b toward a neutral position in a relative displacement therebetween, and holding the input rod 6 and the primary piston 2b at the neutral position in the relative displacement when the vehicle is not braked.

Further, when the input rod 6 and the primary piston 2b are relatively displaced from the neutral position in either direction, the pair of springs 6d and 6e exerts a biasing force for returning the input rod 6 relative to the primary piston 2b to the neutral position.

A rotational angle detection sensor 50a is disposed at the driving motor 50, and a positional signal of the motor output shaft detected thereby is input into the booster controller 8. The booster controller 8 calculates a rotational angle of the driving motor 50 based on the input positional signal, and calculates a thrust force of the rotation-translation converter 55 based on this rotational angle, i.e., a displacement amount of the primary piston 2b in the X axis direction.

Further, a temperature sensor 50b is disposed at the driving motor 50, and detected temperature information of the driving motor 50 is input into the booster controller 8.

(Boosting Control Processing)

Next, how the electric booster 5 and the booster controller 8 amplify a thrust force of the input rod 6 will be described.

The electric booster 5 and the booster controller 8 displace the primary piston 2b according to an amount by which the input rod 6 is displaced by the driver's brake operation. As a result, the primary hydraulic chamber 2d is pressurized by a thrust force of the primary piston 2b in addition to a thrust force of the input rod 6, thereby adjusting the master cylinder hydraulic pressure Pmc. In other words, the thrust force of the input rod 6 is amplified. An amplification ratio (hereinafter referred to as a boosting ratio α) is determined based on, for example, a ratio between cross-sectional areas of the input rod 6 and the primary piston 2b in the primary hydraulic chamber 2d that are perpendicular to the axis (hereinafter referred to as pressure-receiving areas AIR and APP, respectively) in the following manner.

The master cylinder hydraulic pressure Pmc is adjusted based on a pressure balance relationship expressed by the following equation (1).

$$Pmc=(FIR+K\times\Delta x)/AIR=(FPP-K\times\Delta x)/APP \quad (1)$$

In this equation, Pmc represents the hydraulic pressure in the primary hydraulic chamber 2d (the master cylinder hydraulic pressure), FIR represent the thrust force of the input rod 6, FPP represents the thrust force of the primary piston 2b, AIR represents the pressure-receiving area of the input rod 6, APP represents the pressure-receiving area of the primary piston 2b, K represents a spring constant of the springs 6d and 6e, Δx represents the relative displacement amount between the input rod 6 and the primary piston 2b.

The relative displacement amount Δx is defined as Δx=xPP−xIR, assuming that xIR represents the displacement of the input rod 6, and xPP represents the displacement of the primary piston 2b. Therefore, Δx has a value of zero at the neutral position of relative displacement, Δx has a positive value when the primary piston 2b moves forward (is displaced in the positive direction of the X axis) relative to the input rod 6, and Δx has a negative value when the primary piston 2b moves in the reverse direction thereof. The pressure balance equation (1) is defined ignoring a sliding resistance of the seal. The thrust force FPP of the primary piston 2b can be estimated from a current value of the driving motor 50.

On the other hand, the boosting ratio α is expressed by the following equation (2).

$$\alpha=Pmc\times(APP+AIR)/FIR \quad (2)$$

Therefore, by substituting Pmc in the above-described equation (1) into the equation (2), the following equation (3) is obtained as the boosting ratio α.

$$\alpha=(1+K\times\Delta x/FIR)\times(AIR+APP)/AIR \quad (3)$$

The boosting control controls the driving motor 50 (the displacement xPP of the primary piston 2b) so as to acquire a target master cylinder hydraulic characteristic. The master cylinder hydraulic characteristic refers to a characteristic of a change in the master cylinder hydraulic pressure Pmc relative to the displacement xIR of the input rod 6. A target displacement amount calculation characteristic, which indicates a change in the relative displacement amount Δx relative to the displacement xIR of the input rod 6, can be obtained according to a stroke characteristic, which indicates the displacement xPP of the primary piston 2b relative to the displacement xIR of the input rod 6, and the above-described target master cylinder hydraulic characteristic. A target value of the relative displacement amount Δx (hereinafter referred to as a target displacement amount Δx*) is calculated based on target displacement amount calculation characteristic data obtained from an experiment.

In other words, the target displacement amount calculation characteristic indicates the characteristic of a change in the target displacement amount Δx* relative to the displacement xIR of the input rod 6, and one target displacement amount Δx* is determined according to one displacement amount xIR of the input rod 6. Controlling a rotation of the driving motor 50 (the displacement amount xPP of the primary piston 2b) so as to realize the target displacement amount Δx* determined according to the detected displacement amount xIR of the input rod 6 generates the master cylinder hydraulic pressure Pmc corresponding to the target displacement amount Δx* in the master cylinder 2.

As described above, the displacement amount xIR of the input rod 6 is detected by the stroke sensor 7. The displacement amount xPP of the primary piston 2b is calculated based on a signal from the rotational angle detection sensor 50a. The relative displacement amount Δx is calculated from a difference between the detected (calculated) displacement amounts. More specifically, in the boosting control, the target displacement amount Δx* is set based on the detected displacement amount xIR and the target displacement amount calculation characteristic, and the driving motor 50 is controlled (feedback control) in such a manner that the detected (calculated) relative displacement amount Δx matches the target displacement amount Δx*. A stroke sensor may be additionally provided to detect the displacement amount xPP of the primary piston 2b.

Performing boosting control without use of a pressing force sensor in this manner can reduce the cost accordingly. Further, by controlling the driving motor 50 in such a manner that the relative displacement amount Δx reaches an arbitrary predetermined value, it is possible to obtain a larger boosting ratio or a smaller boosting ratio than the boosting ratio determined from the pressure-receiving area ratio (AIR+APP)/AIR, thereby obtaining a braking force based on a desired boosting ratio.

Constant boost ratio control is a control method of controlling the driving motor 50 in such a manner that the input rod 6 and the primary piston 2b are integrally displaced, i.e., the primary piston 2b is constantly located at the above-mentioned neutral position and displaced so as to have the relative displacement amount Δx of 0 relative to the input rod 6. If the primary piston 2b is displaced so as to satisfy Δx=0 in this manner, the boosting ratio α is determined as a fixed value, α=(AIR+APP)/AIR according to the above-described equation (3). Therefore, a fixed (the required) boosting ratio can be constantly obtained by setting AIR and APP based on the required boosting ratio, and controlling the primary piston 2b in such a manner that the displacement amount xPP coincides with the displacement amount xIR of the input rod 6.

According to the target master cylinder pressure characteristic in the constant boost ratio control, the master cylinder hydraulic pressure Pmc generated according to a forward movement of the input rod 6 (a displacement in the positive direction of the X axis) increases in the form of a quadric curve, a cubic curve, or a multi-order curve formed by combining the curves with a curve of a higher order or the like (hereinafter, they are collectively referred to as "multi-order curve"). In addition, the constant boost ratio control has a stroke characteristic in which the primary piston 2b is displaced by a same amount as the displacement xIR of the input rod 6 (xPP=xIR). According to the target displacement amount calculation characteristic obtained based on this stroke characteristic and the above-described target master cylinder hydraulic characteristic, the target displacement amount Δx* is constantly 0 for any displacement xIR of the input rod 6.

On the other hand, variable boosting control is a control method of controlling the driving motor 50 in such a manner that the target displacement amount Δx* is set to a predetermined positive value, and the relative displacement amount Δx reaches this predetermined value. As a result, as the input rod 6 moves forward in the direction causing the master cylinder hydraulic pressure Pmc to increase, the primary piston 2b is controlled in such a manner that the displacement amount xPP of the primary piston 2b becomes larger than the displacement amount xIR of the input rod 6. The boosting ratio α shows an increase of (1+K×Δx/FIR)–fold, according to the above-described equation (3). This is the same as displacing the primary piston 2b by an amount corresponding to the product obtained by multiplying the displacement amount xIR of the input rod 6 by the proportional gain (1+K+Δx/FIR). In this manner, the boosting ratio α is variable according to Δx. The electric booster 5 serves as a boosting source, and it is possible to generate a braking force as requested by the driver while largely reducing a required pedal pressing force.

In other words, although it is desirable in terms of controllability to have the value 1 as the above-described proportional gain (1+K×Δx/FIR), the above-described proportional gain can be temporarily changed to a value greater than 1 when a braking force stronger than an amount of a brake operation of the driver is required due to, for example, emergency braking. As a result, the master cylinder hydraulic pressure Pmc can be increased compared to that at a normal occasion (at the time that the above-described proportional gain is 1) with the same brake operation amount, whereby a greater braking force can be generated. Whether emergency braking should be performed is determined, for example, by determining whether a time rate of change of a signal from the stroke sensor 7 is larger than a predetermined value.

In this manner, the variable boosting control is a method of controlling the driving motor 50 in such a manner that the primary piston 2b moves further forward than a forward movement of the input rod 6, and the relative displacement amount Δx of the primary piston 2b relative to the input rod 6 increases as the input rod 6 moves forward, whereby an increase in the master cylinder hydraulic pressure Pmc due to the forward movement of the input rod 6 is greater than the constant boost ratio control accordingly.

According to the target master cylinder hydraulic characteristic in the variable boosting control, an increase in the master cylinder hydraulic pressure Pmc caused by a forward movement of the input rod 6 (a displacement in the positive direction of the X axis) is greater than the constant boost ratio control (the master cylinder hydraulic characteristic increasing in the form of the multi-order curve is more precipitous).

In addition, the variable boosting control has a stroke characteristic in which an increase in the displacement xPP of the primary piston 2b when the displacement xIR of the input rod 6 increases is 1 or more. According to the target displacement amount calculation characteristic obtained based on this stroke characteristic and the above-described target master cylinder hydraulic characteristic, the target displacement amount Δx* increases at a predetermined ratio as the displacement xIR of the input rod 6 increases.

Further, the variable boosting control may include, in addition to the above-described control [controlling the driving motor 50 in such a manner that the displacement amount xPP of the primary piston 2b becomes greater than the displacement amount xIR of the input rod 6 as the input rod 6 moves in the direction causing the master cylinder hydraulic pressure Pmc to increase], controlling the driving motor 50 in such a manner that the displacement amount xPP of the primary piston 2b becomes less than the displacement amount xIR of the input rod 6 as the input rod 6 moves in the direction causing the master cylinder hydraulic pressure Pmc to increase. By changing the proportional gain to a value less than 1 in this manner, the present invention can be utilized for the regenerative brake control in which the hydraulic brake reduces according to a regenerative braking force of a hybrid vehicle.

Further, instead of the above-described variable boosting control based on the relative displacement amount Δx, the variable boosting control may be performed by feedback control of the electric booster 5 (the driving motor 50) in such a manner that the master cylinder hydraulic pressure Pmc detected by the master cylinder hydraulic pressure sensors 3a and 3b reaches the target master cylinder hydraulic pressure. These variable boosting control methods can be switched according to a situation.

According to the above-described variable boosting control based on the relative displacement amount Δx, the driving motor 50 is not controlled directly based on the detected master cylinder hydraulic pressure Pmc, whereby the detected master cylinder hydraulic pressure Pmc is additionally compared with a master cylinder hydraulic pressure (a target master cylinder hydraulic pressure) according to xIR in the target master cylinder hydraulic characteristic to check whether the desired master cylinder hydraulic pressure Pmc is generated normally, thereby taking measures against a fail (failure).

[Configuration of Electric Circuit of Booster Controller]

Figure 2:
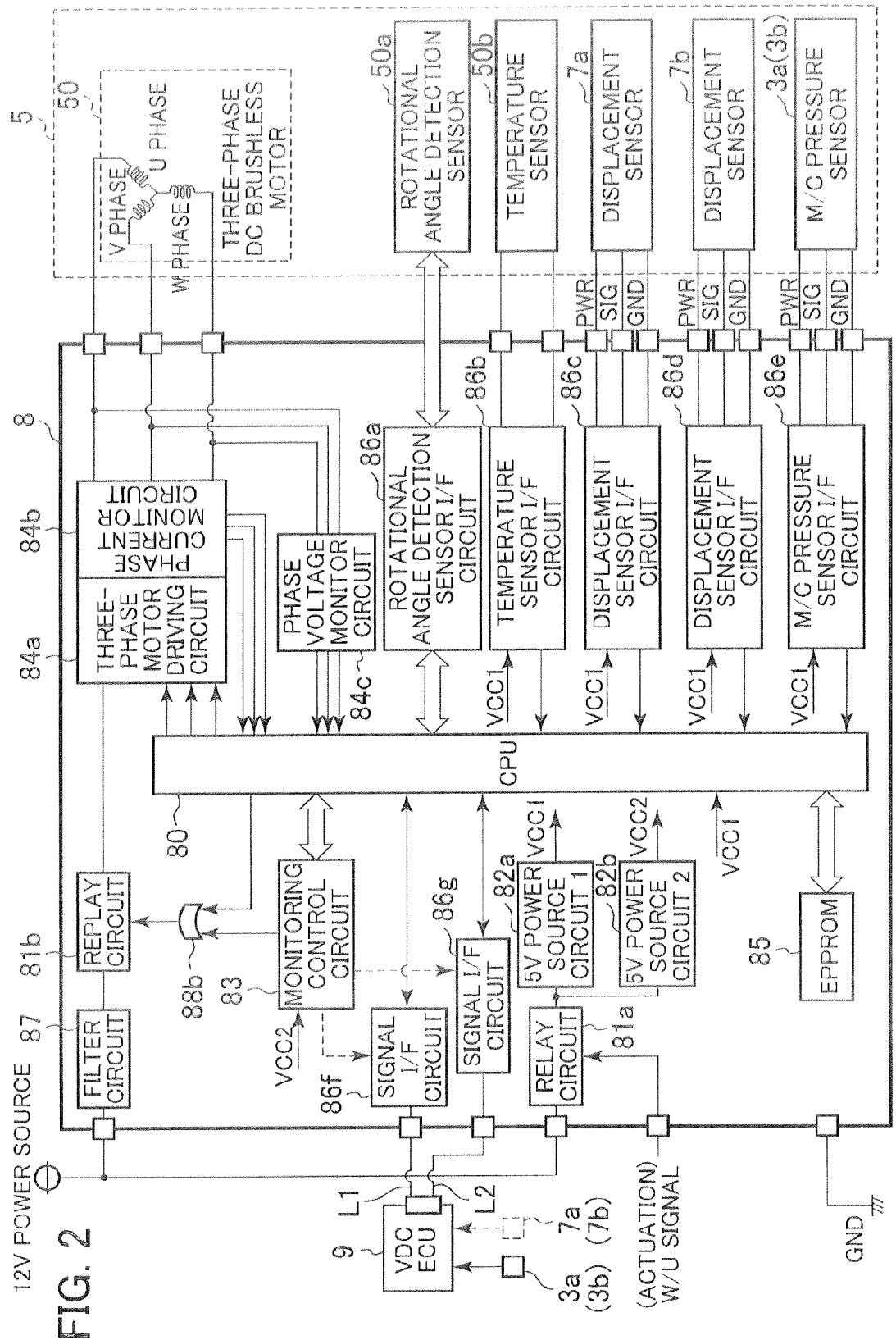
FIG. 2 illustrates a configuration of an electric circuit of a booster controller.

FIG. 2 illustrates a configuration of an electric circuit of the booster controller 8. Referring to FIG. 2, a frame 8 drawn by a thick line indicates the electric circuit of the booster controller 8, and a frame 5 drawn by a broken line indicates an electric circuit of the electric booster 5.

A frame 9 drawn by a thick line indicates the hydraulic controller 9 (an electric circuit thereof), and indicates, for example, an ECU such as VDC.

VDC stands for vehicle dynamics control, which detects an inclination of the vehicle and the like by a sensor, and automatically performs control such as applying a brake force onto a front wheel on an outer side of a corner upon determining an oversteer, while reducing engine power and applying a brake force on a rear wheel on an inner side of the corner upon determining an understeer conversely, according to a driving situation.

The electric circuit of the booster controller 8 includes a central processing unit (hereinafter referred to as a CPU 80), relay circuits 81a and 81b, 5V power source circuits 82a and 82b, a monitoring control circuit 83, a three-phase motor driving circuit 84a, a phase current monitor circuit 84b, a phase voltage monitor circuit 84c, a storage circuit 85, and interface circuits (hereinafter referred to as I/F circuits) 86a to 86g.

Power of 12V is supplied from a power source line in the vehicle to the booster controller 8 via the ECU power relay circuit 81a. The supplied power of 12V is input into the 5V power source circuits 82a and 82b. The 5V power source circuits 82a and 82b generate stable power of 5V (hereinafter referred to as Vcc1 and Vcc2), respectively. The Vcc1 is supplied to the CPU 80, the temperature sensor I/F circuit 86b, the displacement sensor I/F circuits 86c and 86d, the master cylinder hydraulic sensor I/F circuit 86e, and the like. On the other hand, the Vcc2 is supplied to the monitoring control circuit 83.

The ECU power relay circuit 81a is turned on based on a predetermined W/U (activation) signal input from the outside of the booster controller 8. The activation signal can be embodied by a door switch signal, a brake switch signal, an IGN (ignition) switch signal, and the like. If a plurality of signals among them is used, the ECU power relay circuit 81a is configured in such a manner that all of these signals are introduced into the booster controller 8, and then the ECU power relay circuit 81a is turned on when any one of these switch signals is switched on.

Further, power of 12V from the power source line within the vehicle is supplied to the three-phase motor driving circuit 84a via the fail-safe relay circuit 81b after noises are removed therefrom by a filter circuit 87. The fail-safe relay circuit 81b is provided so as to be able to disconnect the above-described power source line and the three-phase motor driving circuit 84a, and is controlled to be turned on/off by the CPU 80 and the monitoring control circuit 83. In this manner, a start and stop of power supply to the three-phase motor driving circuit 84a is controlled. An ON/OFF signal output unit 88b has a circuit configuration to turn off the fail-safe relay circuit 81b when an OFF instruction is input from the CPU 80 or the monitoring control circuit 83.

The CPU 80 and the hydraulic controller 9 are redundantly connected by two communication lines, the first communication line L1 and the second communication line L2. The first communication line L1 is connected to the hydraulic controller 9 via the signal I/F circuit 86f, and the second communication line L2 is connected to the hydraulic controller 9 via the signal I/F circuit 86g. Further, signals from various kinds of sensors disposed at the electric booster side, i.e., the rotational angle detection sensor 50a, the temperature sensor 50b, the displacement sensors 7a and 7b, and the master cylinder hydraulic sensors 3a and 3b are input into the CPU 80 via the rotational angle detection sensor I/F circuit 86a, the temperature sensor I/F circuit 86b, the displacement sensor I/F circuits 86c and 86d, and the master cylinder hydraulic sensor I/F circuit 86e, respectively.

The signals input from the master cylinder hydraulic sensors 3a and 3b are used to compare the detected master cylinder hydraulic pressure Pmc with the target master cylinder hydraulic pressure during the above-described variable boosting control based on the relative displacement amount Δx.

The CPU 80 outputs an appropriate signal to the three-phase motor driving circuit 84a connected to the driving motor 50 based on the above-described signals from the external controllers and detection values of the respective sensors, thereby controlling the driving motor 50. The phase current monitor circuit 84b and the phase voltage monitor circuit 84c are provided for each phase of a three-phase output of the three-phase motor driving circuit 84a, and a current and voltage of each phase are monitored. Each monitor value is output to the CPU 80, and the CPU 80 causes the three-phase motor driving circuit 84a to appropriately operate based on this information.

In this manner, the CPU 80 controls the electric booster 5 (the driving motor 50) based on the information regarding a current state of the electric booster 5 and the like. Further, the CPU 80 is configured to detect and determine a failure in the electric booster 5, for example, when the respective monitor values are beyond a normal range, or the driving motor 50 cannot be controlled as instructed by a control instruction.

The monitoring control circuit 83 transmits/receives a signal to/from the CPU 80, and monitors a failure in the CPU 80, an abnormality in the 5V power source circuit 82a, which is a power source of the CPU 80, and an abnormality in the Vcc1. Upon detection of such a failure or abnormality, the monitoring control circuit 83 immediately outputs a signal to the fail-safe relay circuit 81b to turn off it, thereby stopping power supply to the three-phase motor driving circuit 84a.

The CPU 80 monitors a failure in the monitoring control circuit 83, an abnormality in the 5V power source circuit 82b, which is a power source of the monitoring control circuit 83, and an abnormality in the Vcc2.

The storage circuit 85 is an EEPROM (a nonvolatile memory) that transmits/receives a signal to/from the CPU 80, and stores, for example, failure information. The CPU 80 stores detected failure information, learned values to be used in control of the electric booster 5 (for example, a control gain and offset values of various kinds of sensor), and the like into the storage circuit 85.

When the CPU 80 detects a failure in the electric booster 5, or the monitoring control circuit 83 detects a failure in the CPU 80, the CPU 80 or the monitoring control circuit 83 outputs an abnormality signal from the signal I/F circuits 86f and 86g to the hydraulic controller 9 via the respective communication lines L1 and L2. The CPU 80 is a booster state detection unit that detects a state of the electric booster 5 and transmits a corresponding signal.

Specific examples of the signal (an abnormality detection signal) that the signal I/F circuit 86f outputs to the hydraulic controller 9 include a method of outputting a signal of a HI level when the electric booster 5 is in a normal state while outputting a signal of a LO level (the abnormality detection signal) when a failure is detected (the abnormality detection signal). The examples further include a method of outputting a clock signal alternately changed to the HI level and the LO level in a constant cycle when the electric booster 5 is in a normal state while outputting a signal fixed to the HI level or the LO level when a failure is detected (the abnormality detection signal), and outputting a clock signal (an abnormality signal) when a failure is detected in a different cycle from the cycle before the detection of the failure (when the electric booster 5 is in a normal state).

[Backup Control]

Figure 3:
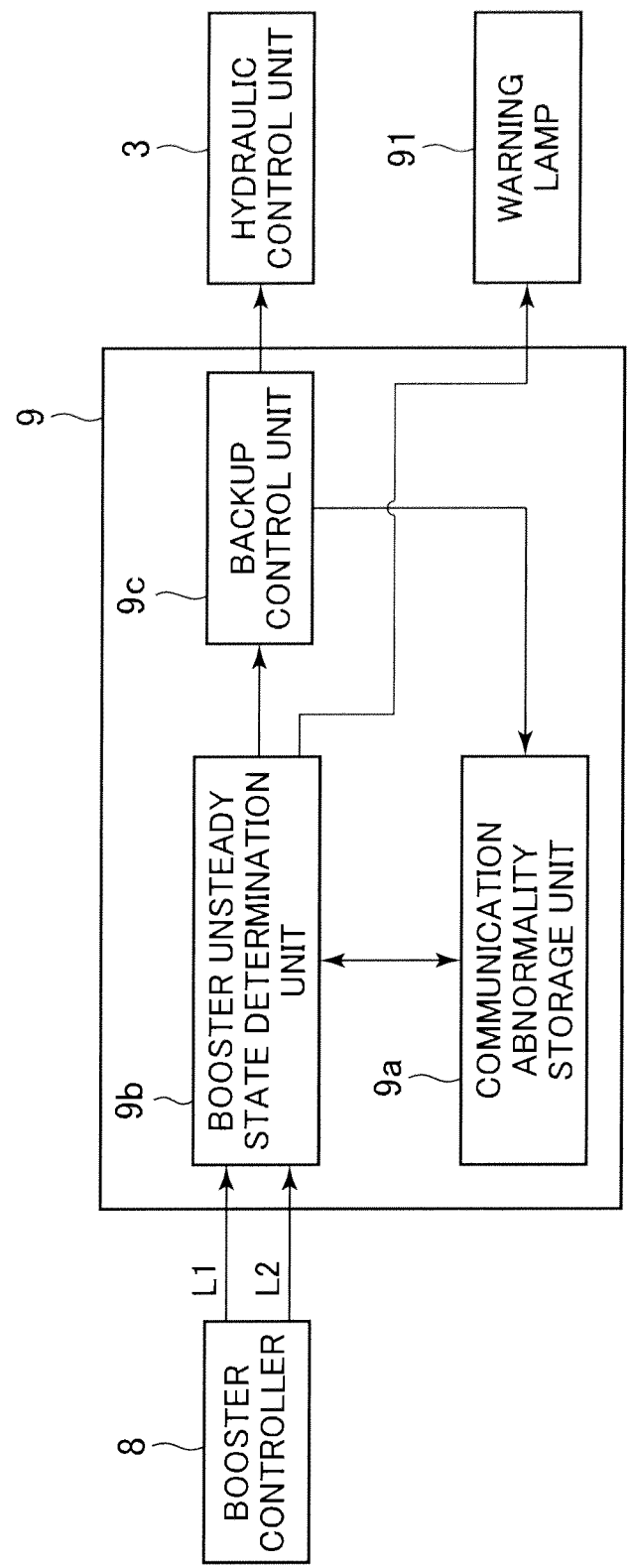
FIG. 3 is a control block diagram of a hydraulic controller according a first embodiment.

FIG. 3 is a control block diagram of the hydraulic controller 9 according to the first embodiment for carrying out the backup control. The hydraulic controller 9 includes a communication abnormality storage unit 9a, a booster unsteady state determination unit 9b, and a backup control unit 9c.

The communication abnormality storage unit 9a stores losses of signals from the respective communication lines L1 and L2 as communication abnormality histories. Further, the communication abnormality storage unit 9a stores execution of the backup control as a backup control execution history. These histories are saved until being updated regardless of whether the ignition is turned on or off.

The booster unsteady state determination unit 9b determines whether the electric booster 5 is in a steady state or an unsteady state. The booster unsteady state determination unit 9b determines that the electric booster 5 is in an unsteady state when at least one of the following conditions is satisfied.

1. An abnormality signal is input from the booster controller 8.
2. The signals from the respective communication lines L1 and L2 are lost concurrently.
3. A communication abnormality and execution of the backup control are stored in the communication abnormality storage unit 9a when the ignition is turned on.

In other words, the unsteady state of the electric booster 5 includes a communication abnormal state such as disconnection of the respective communication lines L1 and L2 due to detachment of connectors, short-circuiting, and the like, in addition to abnormal states of the electric booster 5 and the booster controller 8. The above-described "1. an abnormality signal is input from the booster controller 8" may be such a state that the signal from at least one of the communication lines L1 and L2 indicates an abnormal state (the communication line L1 has a communication abnormality and the signal from the communication line L2 indicates an abnormal state of the booster), and may be such a state that both the signals from the respective communication lines L1 and L2 indicate an abnormal state.

The booster unsteady state determination unit 9b turns on a warning lamp 91 to issue a warning to the driver upon determining that the electric booster 5 is in an unsteady state.

The backup control unit 9c performs the backup control for realizing the boosting system by controlling the hydraulic pressures in the wheel cylinders 4a to 4d according to the driver's brake operation amount with use of the hydraulic control device 3, if the booster unsteady state determination unit 9b determines that the electric booster 5 is in an unsteady state. During the backup control, first, the backup control unit 9c detects a brake operation amount based on the signals input from the master cylinder hydraulic pressure sensors 3a and 3b (the master cylinder hydraulic pressure Pmc), and then determines whether the driver is performing a brake operation with use of the detected brake operation amount. Then, if the brake operation amount is larger than the above-described predetermined value (for example, 0), the backup control unit 9c determines that the driver is performing a brake operation, calculates the target wheel cylinder hydraulic pressure Pwc* based on the brake operation amount, and control driving of the in-side gate valves 17 and 27, the out-side gate valves 11 and 21, and the motor M (the pump P) based on the target wheel cylinder hydraulic pressure Pwc*, thereby performing the boosting control for increasing the wheel cylinder hydraulic pressure Pwc. Due to this backup control, it is possible to refrain from generating a brake force when no brake operation is performed, and immediately control the wheel cylinder hydraulic pressure Pwc to generate a brake force according to the brake operation amount when a brake operation is performed.

Next, an operation will be described.

[Booster Unsteady State Determination Operation]

Figure 4:
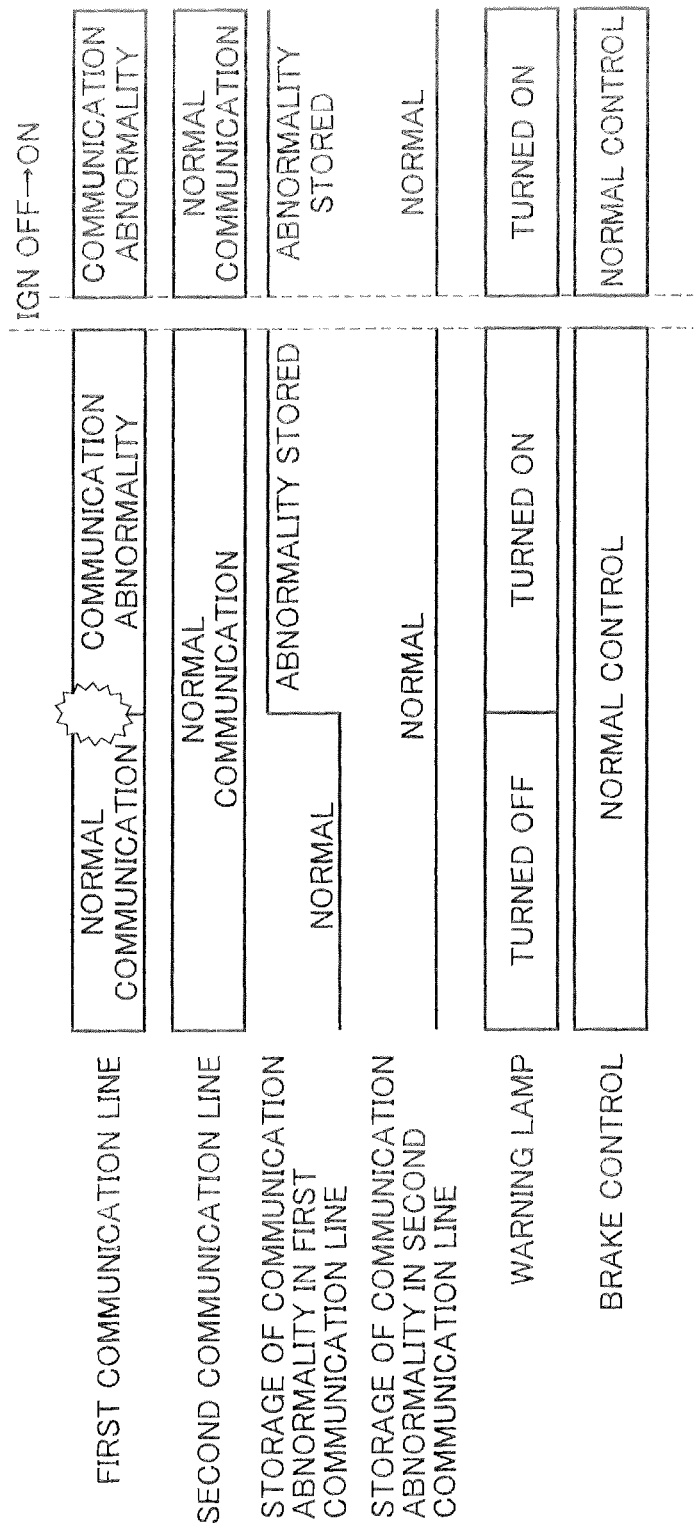
FIG. 4 illustrates an operation when a communication abnormality occurs in one communication line.

FIG. 4 illustrates an operation when a communication abnormality occurs in one of the communication lines. In the first embodiment, the hydraulic controller 9 and the booster controller 8 are redundantly connected via the two communication lines L1 and L2. Therefore, even when a communication abnormality occurs in the first communication line L1, the hydraulic controller 9 can obtain a signal from the booster controller 8 via the second communication line L2. Accordingly, it is possible to further accurately determine whether the electric booster 5 is in an unsteady state, compared to a configuration having only one communication line. In the example illustrated in FIG. 4, the signal obtained from the second communication line L2 is a normality signal, whereby normal control for boosting by the electric booster 5 continues without shifting to the backup control for boosting by the hydraulic control device 3.

Figure 5:
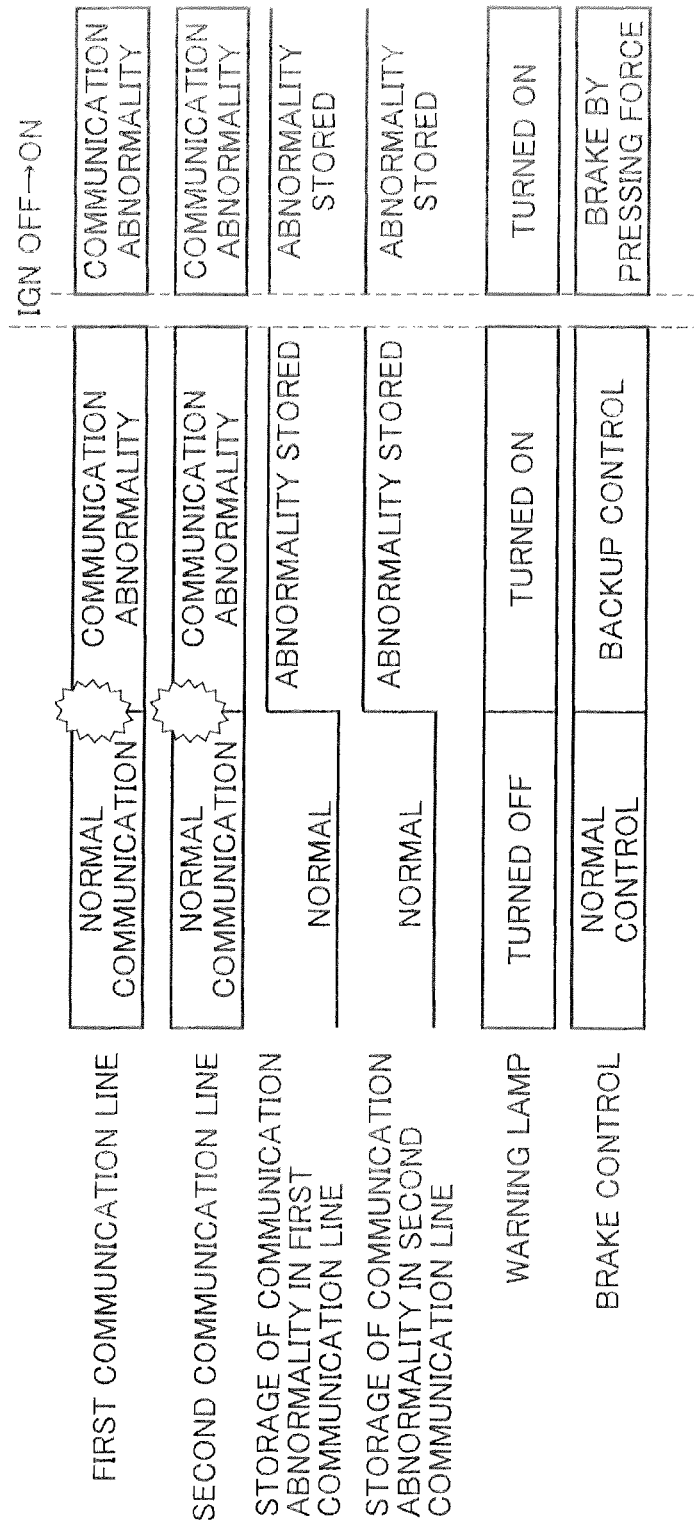
FIG. 5 illustrates an operation in which a backup control execution history is not stored when signals from respective communication lines are lost concurrently as a comparison example with the first embodiment.

FIG. 5 illustrates an operation when the backup control execution history is not stored even if the signals from the respective communication lines are lost concurrently, as a comparative example with the first embodiment. If the signals from the respective communication lines L1 and L2 are lost concurrently, the hydraulic controller 9 switches control from the normal control to the backup control. After that, the ignition is turned off. Next time the ignition is turned on, the respective communication lines L1 and L2 remain disconnected, whereby the hydraulic controller 9 cannot determine whether electric booster 5 has recovered to a normal state, and therefore cannot perform the backup control. This is because execution of the backup control causes both the electric booster 5 and the hydraulic control device 3 to increase the master cylinder hydraulic pressure, which may lead to a trouble such as a breakage, if the electric booster 5 has already recovered to a normal state. Therefore, the comparative example has such a problem that the vehicle is braked only by the driver's pressing force, and fails to obtain a required brake force.

Figure 6:
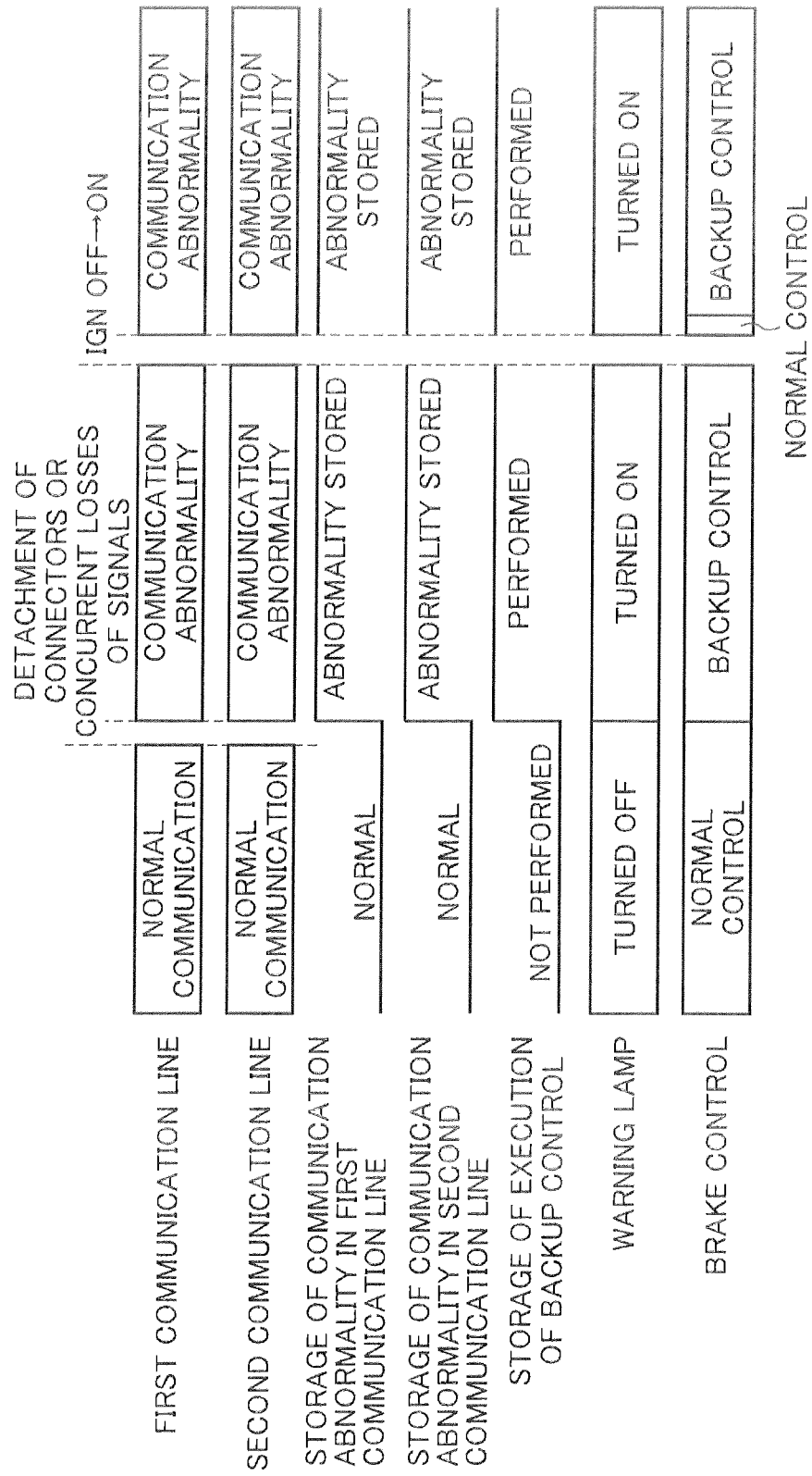
FIG. 6 illustrates a function of determining whether a booster according to the first embodiment is in an unsteady state.

On the other hand, according to the first embodiment, the backup control execution history is stored when the backup control is performed, and the hydraulic controller 9 determines that the electric booster 5 is in an unsteady state to perform the backup control if the backup control execution history is stored when the ignition is turned on. FIG. 6 illustrates an operation of determining whether the booster according to the first embodiment is in an unsteady state. When communication abnormalities occur in the respective communication lines L1 and L2 due to detachment of the connectors or concurrent losses, and the backup control is performed, the communication abnormality histories and the backup control execution history are stored in the communication abnormality storage unit 9a. The booster unsteady state determination unit 9b determines that the electric booster 5 is in an unsteady state if the communication abnormality histories of the respective communication lines L1 and L2 and the backup control execution history are stored in the communication abnormality storage unit 9a (in other words, the signals from the respective communication lines L1 and L2 are lost concurrently) next time the ignition is turned on. In this manner, even when communication abnormalities occur in the respective communication lines L1 and L2, it is possible to accurately determine a state of the electric booster 5.

Then, the backup control unit 9c performs the backup control if the booster is determined to be in an unsteady state, and therefore it is possible to obtain a required brake force in the unsteady state.

The brake control apparatus according to the first embodiment provides the following effects.

(1) The brake control apparatus includes the electric booster 5 configured to increase an operation force exerted by a driver on the brake pedal BP to generate a master cylinder hydraulic pressure to generate hydraulic pressures in the wheel cylinders 4a to 4d, the CPU 80 configured to detect a state of the electric booster 5 and transmit a corresponding signal, the hydraulic control device 3 configured to generate the hydraulic pressures in the wheel cylinders 4a to 4d, the hydraulic controller 9 configured to control the hydraulic control device 3, the first communication line L1 configured to be used to transmit the signal to the hydraulic controller 9, the second communication line L2 arranged in parallel with the first communication line L1 and configured to be used to transmit the signal to the hydraulic controller 9, and the booster unsteady state determination unit 9b provided in the hydraulic controller 9 and configured to determine whether the electric booster 5 is in an unsteady state based on communication states of the signals transmitted via the first communication line L1 and the second communication line L2.

Due to this configuration, it is possible to improve the accuracy for determining whether the electric booster 5 is in an unsteady state.

(2) The booster unsteady state determination unit 9b determines that the electric booster 5 is in an unsteady state if the signals from the respective communication lines L1 and L2 are lost concurrently.

Due to this configuration, it is possible to reliably determine whether the electric booster 5 is in an unsteady state.

(3) The hydraulic controller 9 includes the backup control unit 9c configured to control the hydraulic pressures in the wheel cylinders 4a to 4d according to the driver's brake operation amount by the hydraulic control device 3, if the booster unsteady state determination unit 9b determines that the electric booster 5 is in an unsteady state.

Due to this configuration, it is possible to reliably obtain a required brake force in the unsteady state.

(4) The hydraulic controller 9 includes the communication abnormality storage unit 9a configured to store concurrent losses of the signals from the respective communication lines L1 and L2, and the booster unsteady state determination unit 9b determines that the electric booster 5 is in an unsteady state if concurrent losses of the signals from the respective communication lines L1 and L2 are stored in the communication abnormality storage unit 9a when the ignition is turned on.

Due to this configuration, it is possible to prevent a false operation by holding a previous state.

(5) The brake control apparatus 1 may include the electric booster 5 configured to increase an operation force exerted by the driver on the brake pedal BP to generate a master cylinder hydraulic pressure to generate hydraulic pressures in the wheel cylinders 4a to 4d, the booster controller 8 configured to control the electric booster 5, the CPU 80 provided in the booster controller 8 and configured to detect an abnormal state of the electric booster 5 and transmit an abnormality detection signal, the hydraulic control device 3 configured to generate hydraulic pressures in the wheel cylinders 4a to 4d, the hydraulic controller 9 configured to control the hydraulic control device 3, the first communication line L1 configured to be used to transmit the abnormality detection signal to the hydraulic controller 9, the second communication line L2 arranged in parallel with the first communication line L1 and configured to transmit the abnormality detection signal to the hydraulic controller 9, and the booster unsteady state determination unit 9b provided in the hydraulic controller 9 and configured to determine that the electric booster 5 is in an unsteady state if both the abnormality detection signals transmitted via the first communication line L1 and the second communication line L2 indicate an abnormal state. The hydraulic controller 9 may include the backup control unit 9c configured to control the hydraulic pressures in the wheel cylinders 4a to 4d according to the driver's brake operation amount by the hydraulic control device 3, if the booster unsteady state determination unit 9b determines that the electric booster 5 is in the unsteady state.

Due to this configuration, it is possible to improve the accuracy for determining whether the electric booster 5 is in an unsteady state, and reliably obtain a required brake for in the unsteady state.

(6) The brake control apparatus 1 includes the electric booster 5 configured to increase an operation force exerted by the driver on the brake pedal BP to generate a master cylinder hydraulic pressure to generate hydraulic pressures in the wheel cylinders 4a to 4d, the booster controller 8 configured to control the electric booster 5, the CPU 80 configured to detect a state of the electric booster 5 and transmit a signal corresponding to the detected state, the hydraulic control device 3 configured to generate the hydraulic pressures in the wheel cylinders 4a to 4d, and the hydraulic controller 9 configured to control the hydraulic control device 3. The brake control apparatus 1 redundantly includes the communication lines L1 and L2 configured to be used to transmit a signal between the respective controllers 8 and 9, and determines whether the electric booster 5 is in an unsteady state based on communication states of the respective communication lines L1 and L2.

Due to this configuration, it is possible to improve the accuracy for determining whether the electric booster 5 is in an unsteady state.

Second Embodiment

Figure 7:
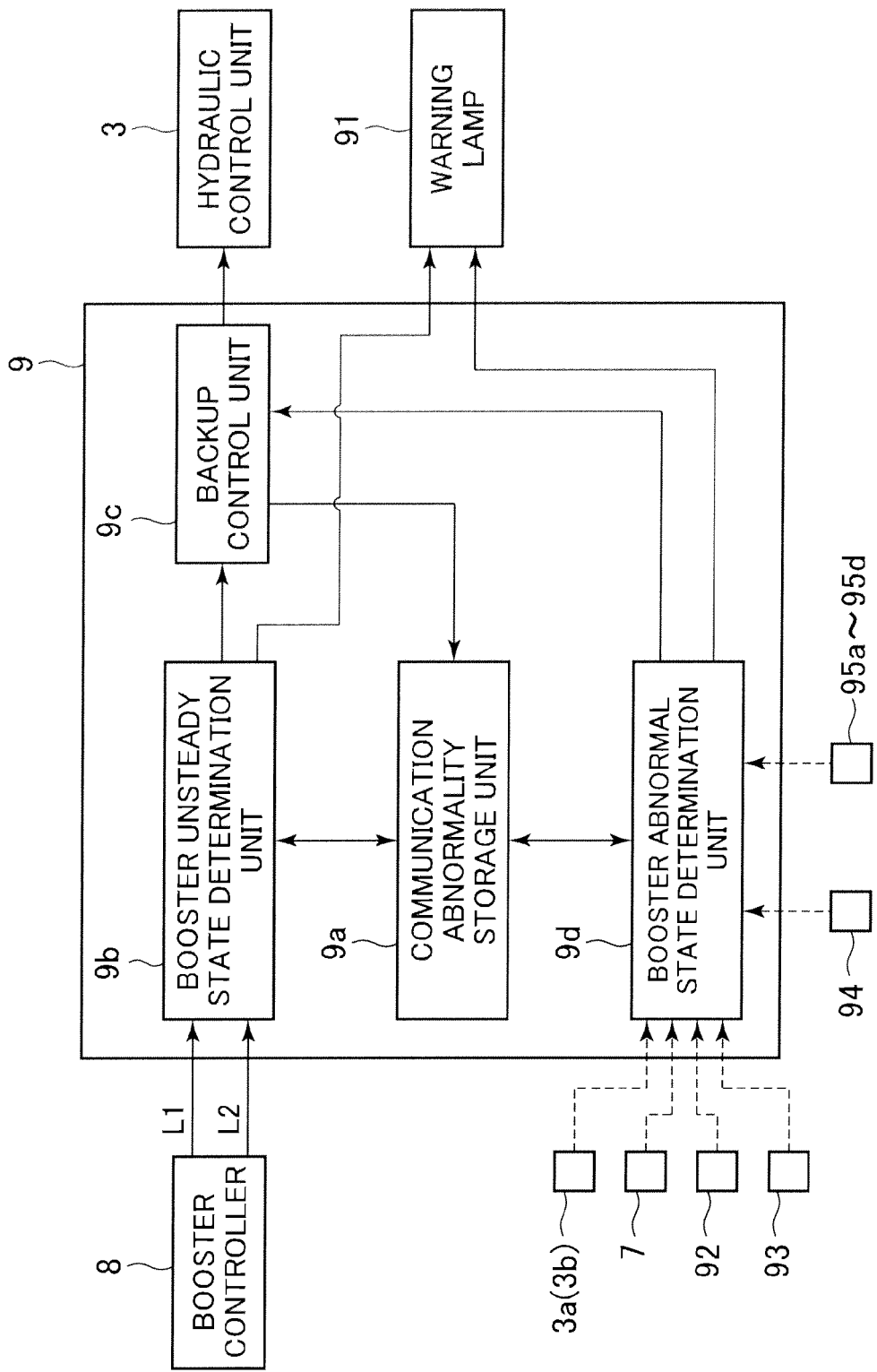
FIG. 7 is a control block diagram of a hydraulic controller according to a second embodiment.

FIG. 7 is a control block diagram of a hydraulic controller according to a second embodiment. The second embodiment is different from the first embodiment in terms that a booster abnormal state determination unit 9d is additionally provided to the configuration according to the first embodiment illustrated in FIG. 3.

The booster unsteady state determination unit 9b determines that the electric booster 5 is in an unsteady state when at least one of the following conditions is satisfied.

1. An abnormality signal is input from the booster controller 8.
2. The signals from the respective communication lines L1 and L2 are lost concurrently.

The booster abnormality state determination unit 9d receives inputs of the communication abnormality history and the backup control execution history stored in the abnormal state storage unit 9a, the master cylinder hydraulic pressure signals from the master cylinder hydraulic pressure sensors 3a and 3b, the stroke signal from the stroke sensor 7, the brake switch signal from the brake switch 92, a pressing force signal from a pressing force sensor (a pressing force detection unit) 93 that detects the driver's pressing force applied on the brake pedal BP, a longitudinal G signal from the longitudinal G sensor (a longitudinal acceleration detection unit) 94 that detects a longitudinal acceleration (a longitudinal G) of the vehicle, and respective wheel speed signals from wheel speed sensors 95a to 95d mounted on the respective wheels.

The booster abnormal state determination unit 9d according to the second embodiment determines that the electric booster 5 is in an abnormal state if the brake switch is switched on but the master cylinder hydraulic pressure does not increase. The booster abnormal state determination unit 9d turns on the warning lamp 91 to issue a warning to the driver upon determining that the electric booster 5 is in an abnormal state.

The backup control unit 9c performs the backup control, if the booster unsteady state determination unit 9b determines that the electric booster 5 is in an unsteady state or if the booster abnormal state determination unit 9d determines that the electric booster 5 is in an abnormal state.

Except for that, the second embodiment is identically configured to the first embodiment, and therefore the illustration and description thereof are omitted herein.

Next, an operation will be described.

[Booster Abnormal State Determination Operation]

Figure 8:
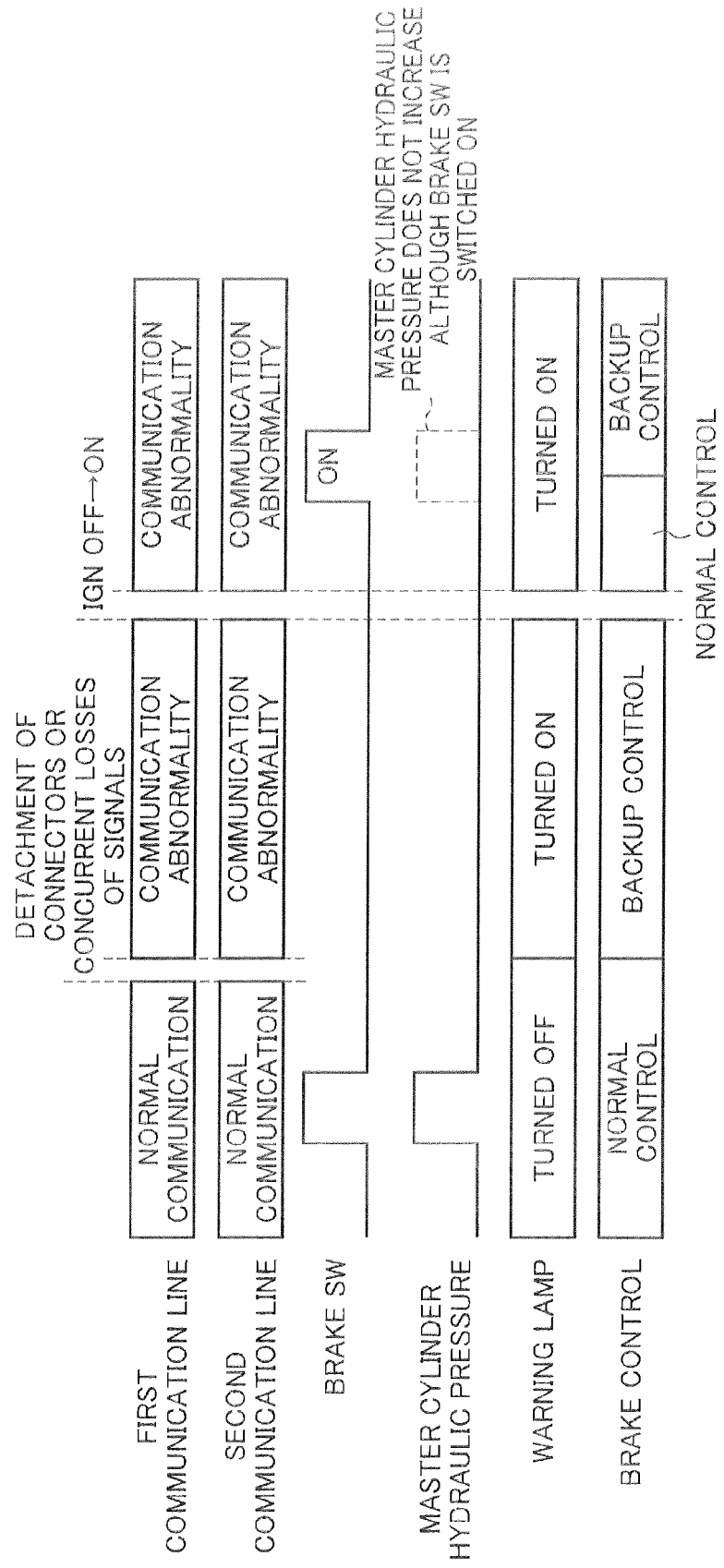
FIG. 8 illustrates a function of determining whether the booster according to the second embodiment is in an abnormal state.

FIG. 8 illustrate an operation for determining whether the booster is in an abnormal state according to the second embodiment. The booster unsteady state determination unit 9b determines that the electric booster 5 is in an unsteady state when communication abnormalities occur in the respective communication lines L1 and L2 due to detachment of the connector or concurrent losses of the signals. In this case, the backup control unit 9c performs the backup control. After that, the ignition is turned off. Next time the ignition is turned on, the drivers pressing of the brake pedal switches on the brake switch 92 but rarely causes a rise of the master cylinder hydraulic pressure due to the operation abnormality in the electric booster 5, whereby the booster abnormality state determination unit 9d determines that the electric booster 5 is in an abnormal state. In this manner, even when communication abnormalities occur in the respective communication lines L1 and L2 (the signals from the respective communication lines L1 and L2 are lost concurrently), even if the booster unsteady state determination unit 9b determines that the electric booster 5 is in a steady state, it is possible to accurately determine that an abnormality occurs in the electric booster 5. Then, the backup control unit 9c performs the backup control if the electric booster 5 is determined to be in an abnormal state, whereby it is possible to reliably obtain a required brake force in the unsteady state.

The brake control apparatus according to the second embodiment provides the following effect, in addition to the effects (1), (2), (3), (5), and (6) of the first embodiment.

(7) The brake control apparatus 1 includes the brake switch 92 configured to detect whether the brake pedal BP is operated, the master cylinder hydraulic sensors 3a and 3b configured to detect the master cylinder hydraulic pressure, and the booster abnormal state determination unit 9d configured to determine that the electric booster 5 is in an abnormal state if the brake switch 92 is switched on but the detected master cylinder hydraulic pressure does not increase accordingly.

Due to this configuration, it is possible to detect an operation abnormality in the electric booster 5.

Third Embodiment

The booster abnormal state determination unit 9d according to a third embodiment is different from the second embodiment in terms that it determines that the electric booster 5 is in an abnormal state if communication abnormalities and execution of the backup control are stored in the communication abnormality storage unit 9a and the brake switch 92 is switched on but the master cylinder hydraulic pressure does not increase when the ignition is turned on.

Except for that, the third embodiment is identically configured to the second embodiment, and therefore the illustration and description thereof are omitted herein.

Next, an operation will be described.

[Booster Abnormal State Determination Operation]

Figure 9:
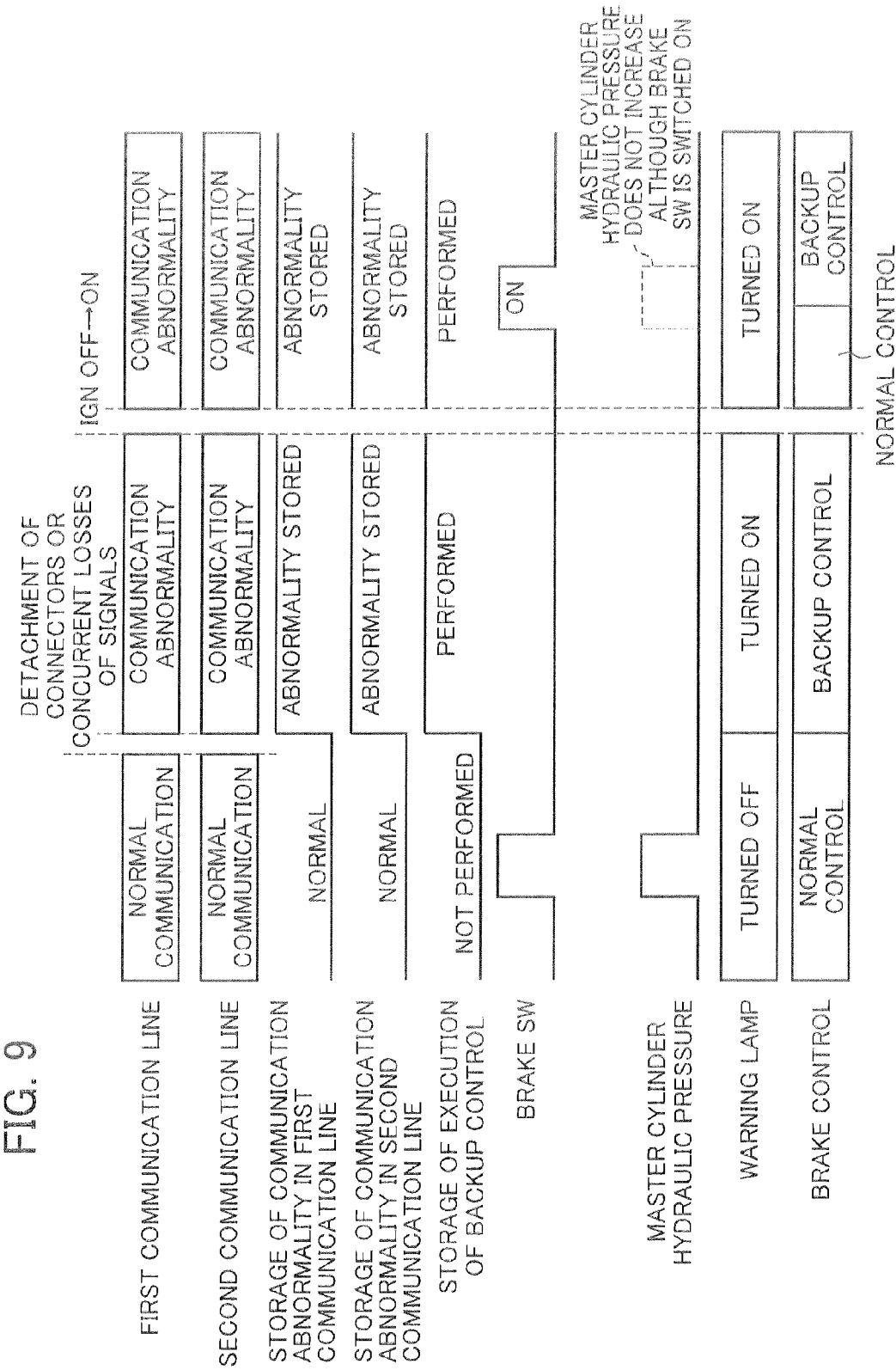
FIG. 9 illustrates a function of determining an abnormal state of the booster according to a third embodiment.

FIG. 9 illustrates an operation for determining whether the booster is in an abnormal state according to the third embodiment. If communication abnormalities occur in the respective communication lines L1 and L2 due to detachment of the connector or concurrent losses of the signals, the booster unsteady state determination unit 9b determines that the booster is in an unsteady state, whereby the backup control unit 9c performs the backup control, and communication abnormality histories and a backup control execution history (i.e., concurrent losses of the signals from the respective communication lines) are stored in the communication abnormality storage unit 9a. After that, the ignition is turned off. Next time the ignition is turned on, the driver's pressing of the brake pedal switches on the brake switch 92 but rarely causes a rise of the master cylinder hydraulic pressure due to an operation abnormality in the electric booster 5. Further, the communication abnormality histories and the backup control execution history are stored in the communication abnormality storage unit 9a. Therefore, the booster abnormal state determination unit 9d determines that the electric booster 5 is in an abnormal state. In this manner, even when communication abnormalities occur in the respective communication lines L1 and L2 (even when the signals from the respective communication lines L1 and L2 are lost concurrently), even if the booster unsteady state determination unit 9b determines that the electric booster 5 is in a steady state, it is possible to reliably determine that an abnormality occurs in the electric booster 5. Then, the backup control unit 9c performs the backup control according to the determination of the abnormal state, whereby it is possible to reliably obtain a required brake force in the unsteady state.

The brake control apparatus according to the third embodiment provides the following effect, in addition to the effects (1), (2), (3), (5), and (6) of the first embodiment.

(8) The brake control apparatus includes the communication abnormality storage unit 9a configured to store losses of the signals from the respective communication lines L1 and L2, the brake switch 92 configured to detect whether the brake pedal BP is operate by the driver, the master cylinder hydraulic pressure sensors 3a and 3b configured to detect the master cylinder hydraulic pressure, and the booster abnormal state determination unit 9d configured to determine that the electric booster 5 is in an abnormal state if losses of the signals are stored in the communication abnormality storage unit 9a, and the detected master cylinder hydraulic pressure does not increase although the brake switch 92 is switched on when the ignition is turned on.

Due to this configuration, it is possible to reliably determine whether an operation abnormality occurs in the electric booster 5.

Fourth Embodiment

The booster abnormal state determination unit 9d according to a fourth embodiment is different from the second embodiment in terms that it determines that the electric booster 5 is in an abnormal state if the master cylinder hydraulic pressure does not increase although a stroke is detected by the stroke sensor 7.

Except for that, the fourth embodiment is identically configured to the second embodiment, and therefore the illustration and description thereof are omitted herein.

Next, an operation will be described.

[Booster Abnormal State Determination Operation]

Figure 10:
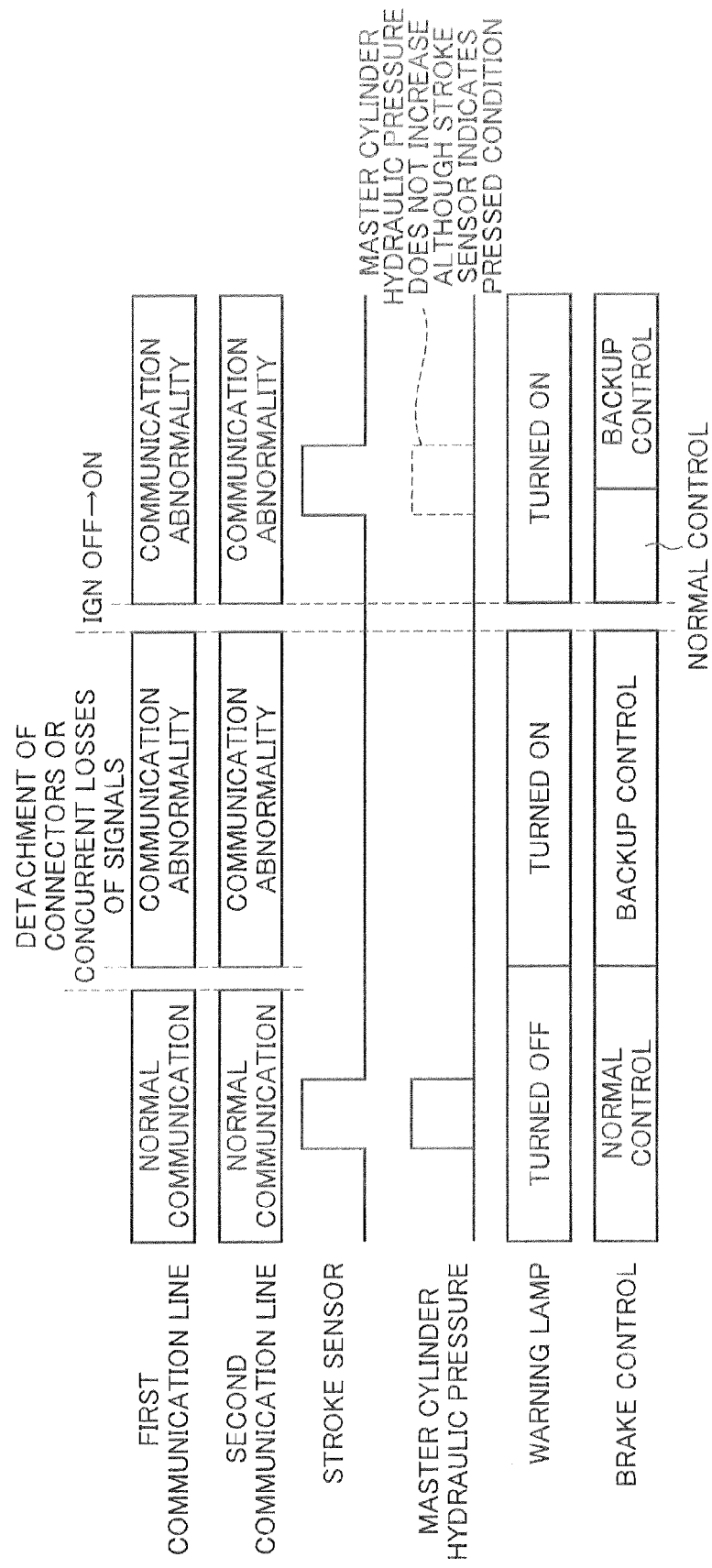
FIG. 10 illustrates a function of determining whether the booster is in an abnormal state according to a fourth embodiment.

FIG. 10 illustrates an operation for determining whether the booster a is in an abnormal state according to the fourth embodiment. The booster unsteady state determination unit 9b determines that the booster is in an unsteady state if communication abnormalities occur in the respective communication lines L1 and L2 due to detachment of the connectors or concurrent losses of the signals. Then, the backup control unit 9c performs the backup control. After that, the ignition is turned off. If the driver's pressing of the brake pedal causes a rise of a stroke of the brake pedal BP but rarely causes a rise of the master cylinder hydraulic pressure next time the ignition is turned on, the booster abnormal state determination unit 9d determines that the electric booster 5 is in an abnormal state. In this manner, even when communication abnormalities occur in the respective communication lines L1 and L2 (even when the signals from the respective communication lines L1 and L2 are lost concurrently), even if the booster unsteady state determination unit 9b determines that the electric booster 5 is in a steady state, it is possible to accurately determine that an abnormality occurs in the electric booster. Then, the backup control unit 9c performs the backup control according to the determination of the abnormal state, whereby it is possible to reliably obtain a required brake force in the unsteady state.

The brake control apparatus according to the fourth embodiment provides the following effect, in addition to the effects (1), (2), (3), (5), and (6) of the first embodiment.

(9) The brake control apparatus 1 includes the stroke sensor 7 configured to detect a stroke of the brake pedal BP, the master cylinder hydraulic pressure sensors 3a and 3b configured to detect the master cylinder hydraulic pressure, and the booster abnormal state determination unit 9d configured to determine that the electric booster 5 is in an abnormal state if the detected master cylinder hydraulic pressure does not increase although a stroke is detected by the stroke sensor 7.

Due to this configuration, it is possible to detect an operation abnormality in the electric booster 5.

Fifth Embodiment

The booster abnormal state determination unit 9d according to a fifth embodiment is different from the second embodiment in terms that it determines that the electric booster 5 is in an abnormal state if communication abnormalities and execution of the backup control are stored in the communication abnormality storage unit 9a and if the master cylinder hydraulic pressure does not increase although a stroke is detected by the stroke sensor 7 when the ignition is turned on.

Except for that, the fifth embodiment is identically configured to the second embodiment, and therefore the illustration and description thereof are omitted herein.

Next, an operation will be described.

[Booster Abnormal State Determination Operation]

Figure 11:
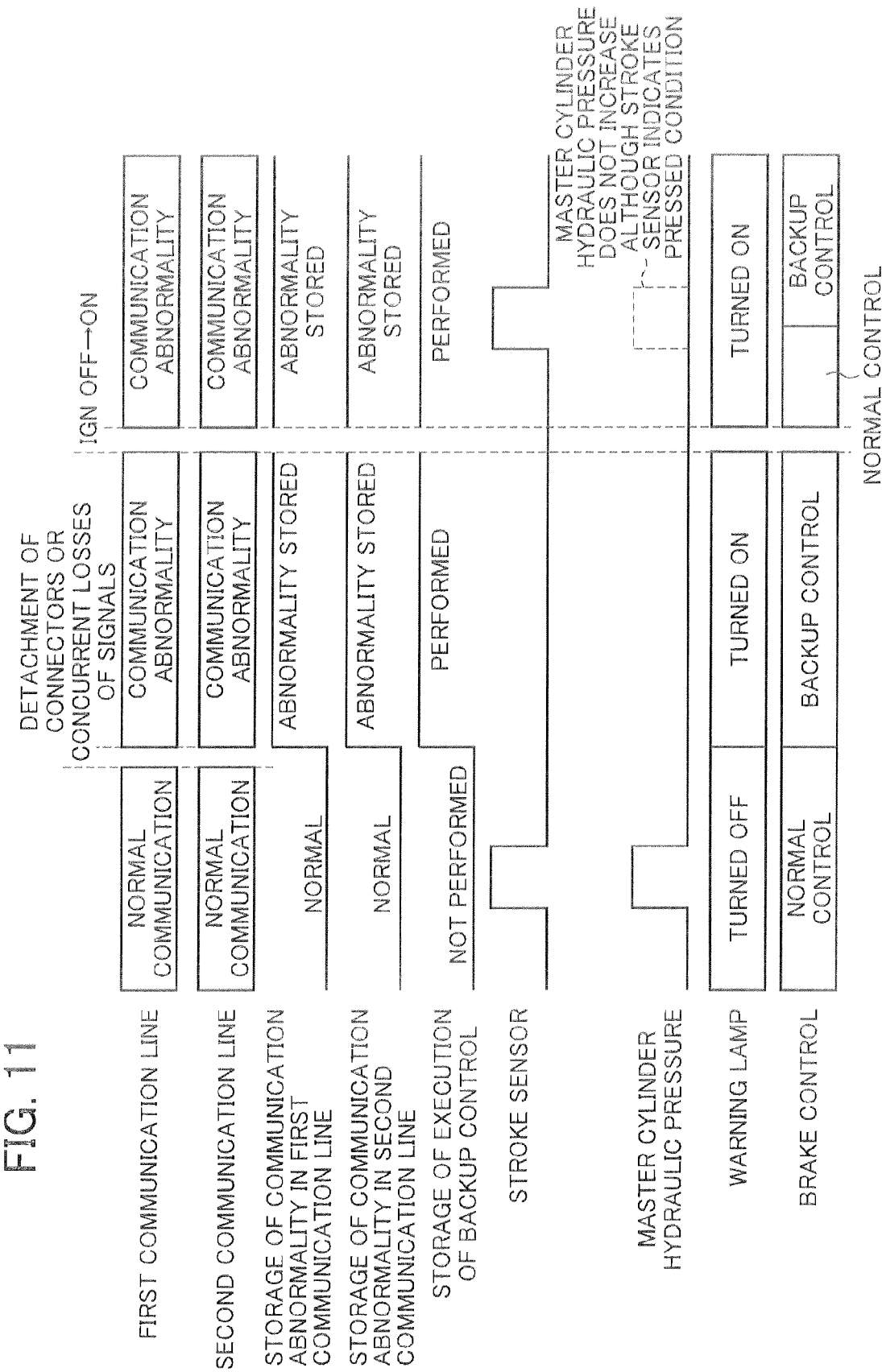
FIG. 11 illustrates a function of determining whether the booster is in an abnormal state according to a fifth embodiment.

FIG. 11 illustrates an operation for determining whether the booster is in an abnormal state according to a fifth embodiment. If communication abnormalities occur in the respective communication lines L1 and L2 due to detachment of the connectors or concurrent losses of the signals, the booster unsteady state determination unit 9b determines that the booster is in an unsteady state. Then, the backup control unit 9c performs the backup control, and communication abnormality histories and a backup control execution history (i.e., concurrent losses of the signals from the respective communication lines L1 and L2) are stored in the communication abnormality storage unit 9a. After that, the ignition is turned off. Next time the ignition is turned on, the driver's pressing of the brake pedal causes a rise of a stroke of the brake pedal BP but rarely causes a rise of the master cylinder hydraulic pressure due to an operation abnormality in the electric booster 5. Further, the communication abnormality histories and the backup control execution history are stored in the communication abnormality storage unit 9a. Therefore, the booster abnormal state determination unit 9d determines that the electric booster 5 is in an abnormal state. In this manner, even when communication abnormalities occur in the respective communication lines L1 and L2 (even when the signals from the respective communication lines L1 and L2 are lost concurrently), even if the booster unsteady state determination unit 9b determines that the electric booster 5 is in a steady state, it is possible to reliably determine that an abnormality occurs in the electric booster 5. Then, the backup control unit 9c performs the backup control according to the determination of the abnormal state, whereby it is possible to reliably obtain a required brake force in the unsteady state.

The brake control apparatus according to the fifth embodiment provides the following effect, in addition to the effects (1), (2), (3), (5), and (6) of the first embodiment.

(10) The brake control apparatus 1 includes the communication abnormality storage unit 9a configured to store concurrent losses of the signals from the respective communication lines L1 and L2, the stroke sensor 7 configured to detect a stroke of the brake pedal BP, the master cylinder hydraulic pressure sensors 3a and 3b configured to detect the master cylinder hydraulic pressure, and the booster abnormal state determination unit 9d configured to determine that the electric booster 5 is in an abnormal state if concurrent losses of the signals are stored in the communication abnormality storage unit 9a and the detected master cylinder hydraulic pressure does not increase although a stroke of the brake pedal BP is detected when the ignition is turned on.

Due to this configuration, it is possible to reliably determine an operation abnormality in the electric booster 5.

Sixth Embodiment

The booster abnormal state determination unit 9d according to the sixth embodiment is different from the second embodiment in terms that it determines that the electric booster 5 is in an abnormal state if the master cylinder hydraulic pressure does not increase although a pressing force is detected by a pressing force sensor 93.

Except for that, the sixth embodiment is identically configured to the second embodiment, and therefore the illustration and description thereof are omitted herein.

Next, an operation will be described.

[Booster Abnormal State Determination Operation]

Figure 12:
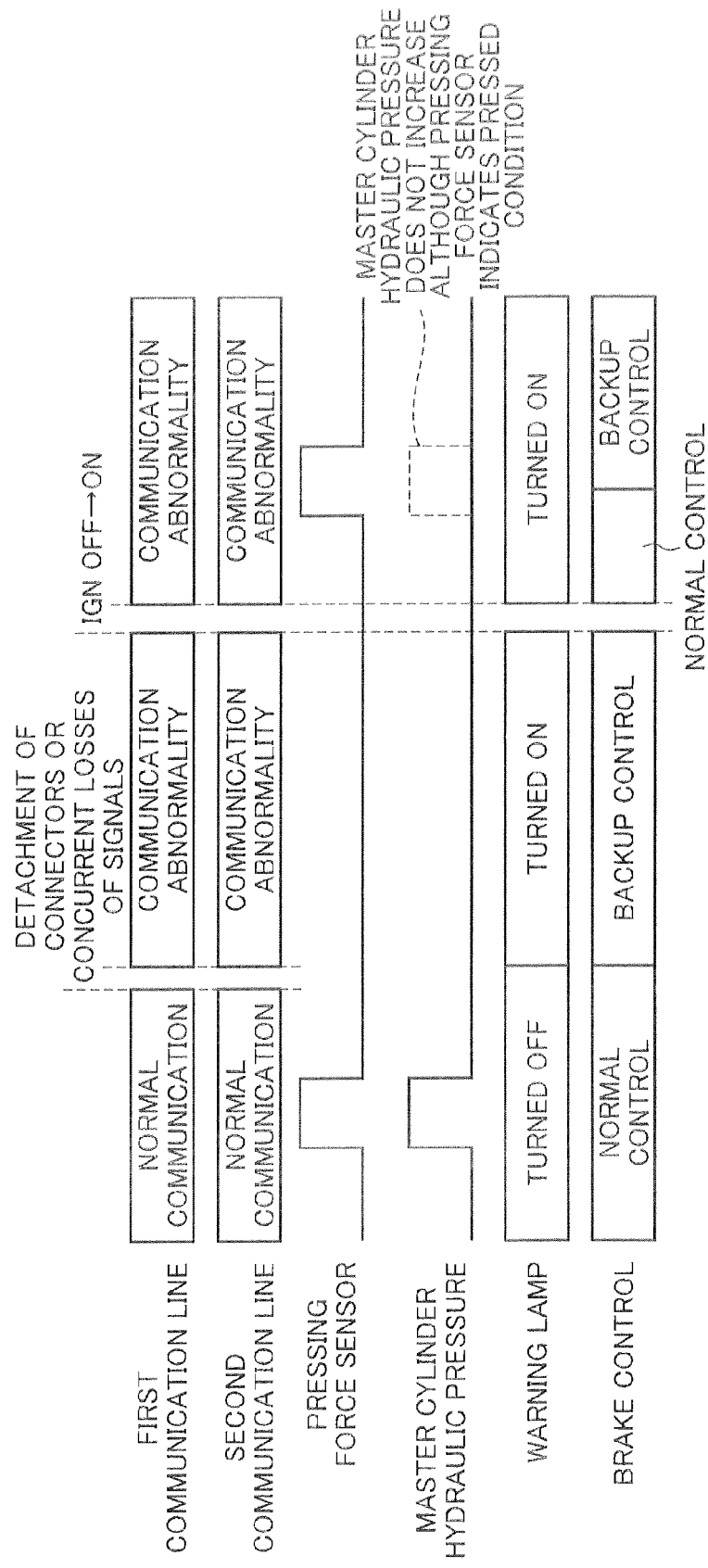
FIG. 12 illustrates a function of determining whether the booster is in an abnormal state according to a sixth embodiment.

FIG. 12 illustrates an operation for determining whether the booster is in an abnormal state according to the sixth embodiment. If communication abnormalities occur in the respective communication lines L1 and L2 due to detachment of the connector or concurrent losses of the signals, the booster unsteady state determination unit 9b determines that the booster is in an unsteady state, and the backup control unit 9c performs the backup control. After that, the ignition is turned off. Next time the ignition is turned on, the driver's pressing of the brake pedal causes a rise of the pedal pressing force but rarely causes a rise of the master cylinder hydraulic pressure due to an operation abnormality in the electric booster 5, whereby the booster abnormal state determination unit 9d determines that the electric booster 5 is in an abnormal state. In this manner, even when communication abnormalities occur in the respective communication lines L1 and L2 (the signals from the respective communication lines L1 and L2 are lost), even if the booster unsteady state determination unit 9b determines that the electric booster 5 is in a steady state, it is possible to accurately determine that an abnormality occurs in the electric booster 5. Then, the backup control unit 9c performs the backup control according to the determination of the abnormal state, whereby it is possible to reliably obtain a required brake force in the unsteady state.

The brake control apparatus according to the sixth embodiment provides the following effect, in addition to the effects (1), (2), (3), (5), and (6) of the first embodiment.

(11) The brake control apparatus 1 includes the pressing force sensor 93 configured to detect a pressing force applied on the brake pedal BP, the master cylinder hydraulic pressure sensors 3a and 3b configured to detect the master cylinder hydraulic pressure, and the booster abnormal state determination unit 9d configured to detect that the electric booster 5 is in an abnormal state if the detected master cylinder hydraulic pressure does not increase although a pressing force is detected by the pedal pressing force sensor 93.

Due to this configuration, it is possible to detect an operation abnormality in the electric booster 5.

Seventh Embodiment

The booster abnormal state determination unit 9d according to a seventh embodiment is different from the second embodiment in terms that it determines that the electric booster 5 is in an abnormal state if communication abnormalities and execution of the backup control are stored in the communication abnormality storage unit 9a, and the master cylinder hydraulic pressure does not increase although a pressing force is detected by the pressing force sensor 93 when the ignition is turned on.

Except for that, the seventh embodiment is identically configured to the second embodiment, and therefore the illustration and description thereof are omitted herein.

Next, an operation will be described.

[Booster Abnormal State Determination Operation]

Figure 13:
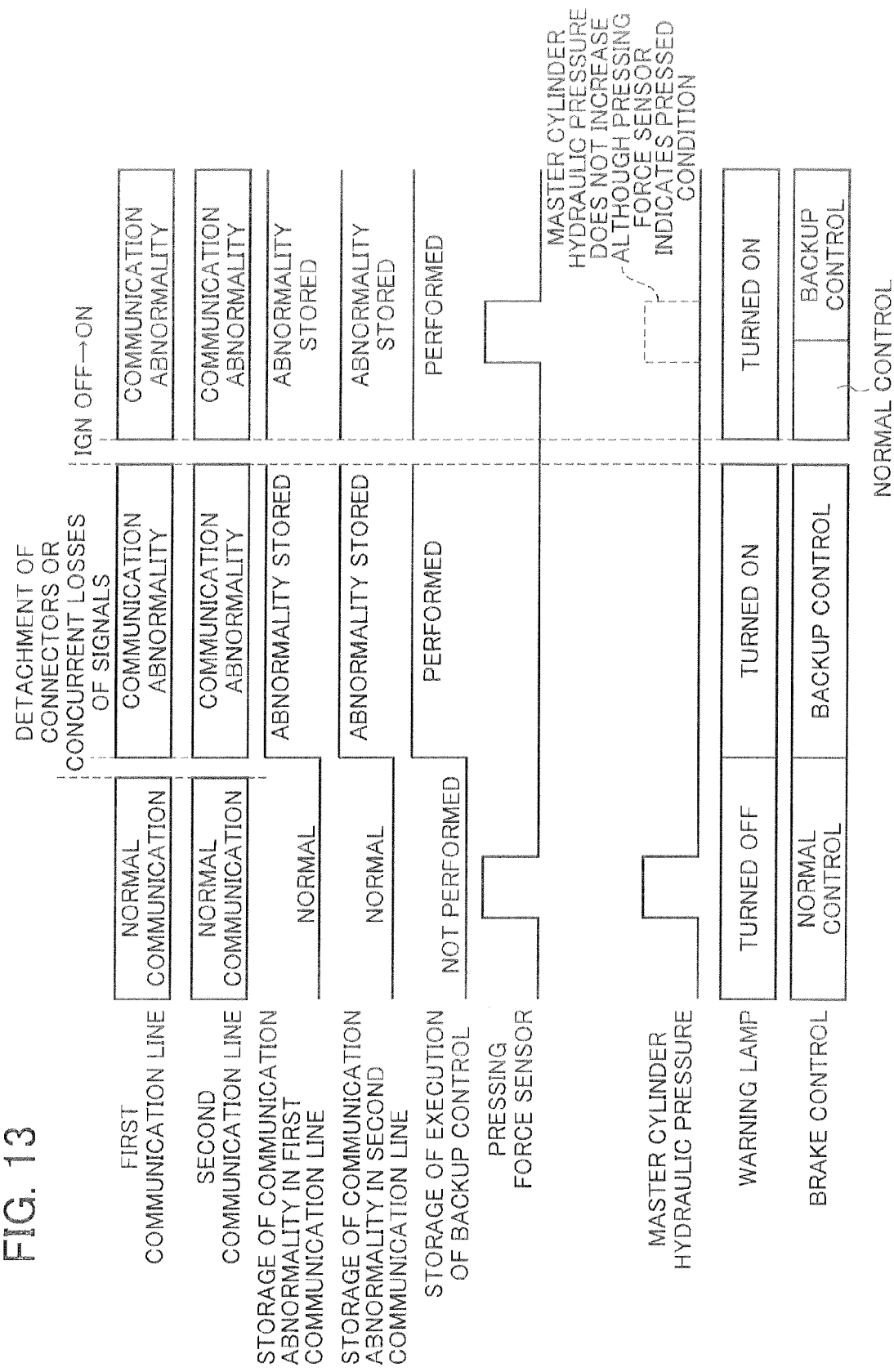
FIG. 13 illustrates a function of determining whether the booster is in an abnormal state according to a seventh embodiment.

FIG. 13 illustrates an operation for determining whether the booster is in an abnormal state according to the seventh embodiment. If communication abnormalities occurs in the respective communication lines L1 and L2 due to detachment of the connectors or concurrent losses of the signals, the booster unsteady state determination unit 9b determines that the booster is in an unsteady state. Then, the backup control unit 9c performs the backup control, and communication abnormality histories and a backup control execution history (concurrent losses of the signals from the respective communication lines L1 and L2) are stored in the communication abnormality storage unit 9a. After that, the ignition is turned off. Next time the ignition is turned on, the driver's pressing of the brake pedal causes a rise of the pressing force but rarely causes a rise of the master cylinder hydraulic pressure due to an operation abnormality in the electric booster 5. Further, the communication abnormality histories and the backup control execution history are stored in the communication abnormality storage unit 9a. Therefore, the booster abnormal state determination unit 9d determines that the electric booster 5 is in an abnormal state. In this manner, even when communication abnormalities occur in the respective communication lines L1 and L2 (even when the signals from the respective communication lines L1 and L2 are lost concurrently), even if the booster unsteady state determination unit 9b determines that the electric booster 5 is in a steady state, it is possible to reliably determine that an abnormality occurs in the electric booster 5. Then, the backup control unit 9c performs the backup control according to the determination of the abnormal state, whereby it is possible to reliably obtain a required brake force in the unsteady state.

The brake control apparatus 1 according to the seventh embodiment provides the following effect, in addition to the effects (1), (2), (3), (5), and (6) of the first embodiment.

(12) The brake control apparatus 1 includes the communication abnormality storage unit 9a configured to store losses of the signals from the respective communication lines L1 and L2, the pressing force sensor 93 configured to detect a pressing force applied on the brake pedal BP, the master cylinder hydraulic pressure sensors 3a and 3b configured to detect the master cylinder hydraulic pressure, and the booster abnormal state determination unit 9d configured to determine that the electric booster 5 is in an abnormal state if losses of the signals are stored in the communication abnormality storage unit 9a and the detected master cylinder hydraulic pressure does not increase although a pressing force is detected by the pressing force sensor 93 when the ignition is turned on.

Due to this configuration, it is possible to reliably whether determine an operation abnormality occurs in the electric booster 5.

Eighth Embodiment

The booster abnormal state determination unit 9d according to an eighth embodiment is different from the second embodiment in terms that it determines that the electric booster 5 is in an abnormal state if the stroke amount of the brake pedal BP does not increase although the brake switch 92 is switched on.

Except for that, the eighth embodiment is identically configured to the second embodiment, and therefore the illustration and description thereof are omitted herein.

Next, an operation will be described.

[Booster Abnormal State Determination Operation]

Figure 14:
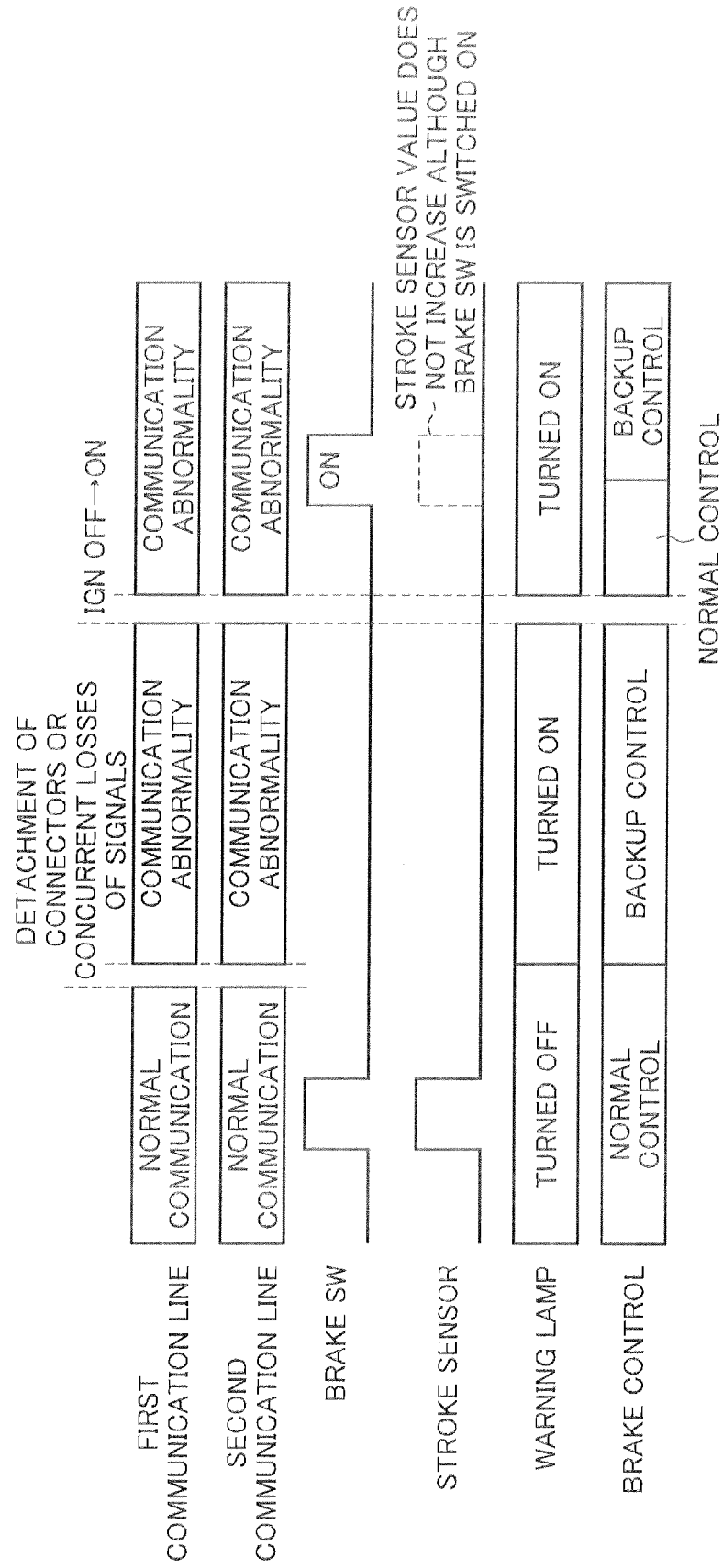
FIG. 14 illustrates a function of determining whether the booster is in an abnormal state according to a eighth embodiment.

FIG. 14 illustrates an operation for determining whether the booster is in an abnormal state according to the eighth embodiment. If communication abnormalities occur in the respective communication lines L1 and L2 due to detachment of the connectors or concurrent losses of the signals, the booster unsteady state determination unit 9b determines that the booster is in an unsteady state, and the backup control unit 9c performs the backup control. After that, the ignition is turned off. Next time the ignition is turned on, the driver's pressing of the brake pedal switches on the brake switch 92 but rarely causes a rise of the stroke of the brake pedal BP due to an operation abnormality in the electric booster 5, whereby the booster abnormal state determination unit 9d determines that the electric booster 5 is in an abnormal state. In this manner, even when communication abnormalities occur in the respective communication lines L1 and L2 (even when the signals from the respective communication lines L1 and L2 are lost concurrently, even if the booster unsteady state determination unit 9b determines that the electric booster 5 is in a steady state, it is possible to accurately determine that an abnormality occurs in the electric booster 5. Then, the backup control unit 9c performs the backup control according to the determination of the abnormal state, whereby it is possible to reliably obtain a required brake force in the unsteady state.

The brake control apparatus according to the eighth embodiment provides the following effect, in addition to the effects (1), (2), (5), (3) and (6) of the first embodiment.

(13) The brake control apparatus 1 includes the brake switch 92 configured to detect whether the brake pedal BP is operated by the driver, the stroke sensor 7 configured to detect a stroke of the brake pedal BP, and the booster abnormal state determination unit 9d configured to detect that the electric booster 5 is in an abnormal state if the stroke amount of the brake pedal BP does not increase although the brake switch 92 is switched on.

Due to this configuration, it is possible to detect an operation abnormality in the electric booster 5.

Ninth Embodiment

The booster abnormal state determination unit 9d according to a ninth embodiment is different from the second embodiment in terms that it determines that the electric booster 5 is in an abnormal state if communication abnormalities and execution of the backup control are stored in the communication abnormality storage unit 9a and the stroke amount of the brake pedal BP does not increase although the brake switch 92 is switched on when the ignition is turned on.

Except for that, the ninth embodiment is identically configured to the second embodiment, and therefore the illustration and description thereof are omitted herein.

Next, an operation will be described.

[Booster Abnormal State Determination Operation]

Figure 15:
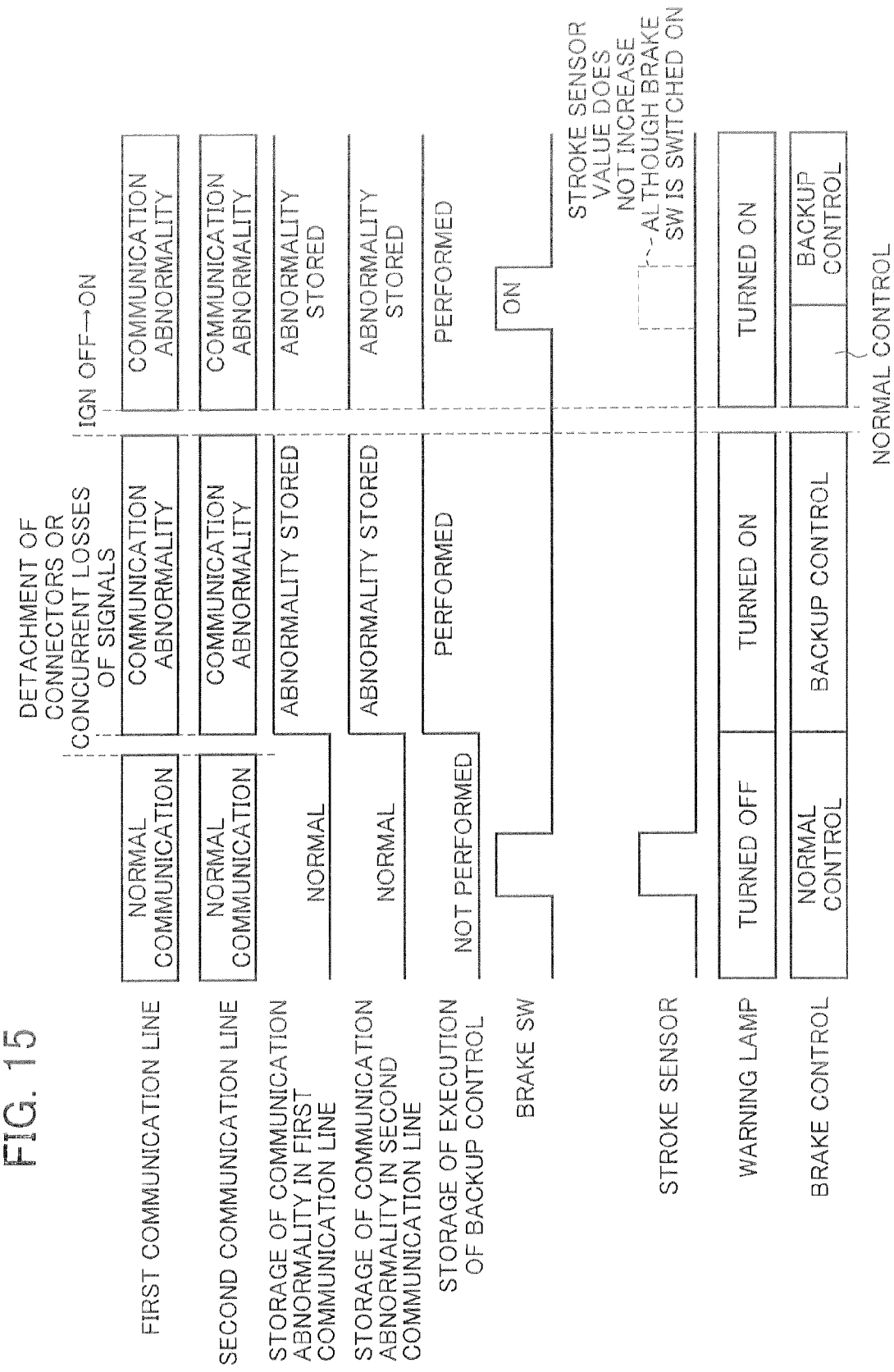
FIG. 15 illustrates a function of determining whether the booster is in an abnormal state according to a ninth embodiment.

FIG. 15 illustrates an operation for determining whether the booster is in an abnormal state according to the ninth embodiment. If communication abnormalities occur in the respective communication lines L1 and L2 due to detachment of the connectors or concurrent losses of the signals, the booster unsteady state determination unit 9b determines that the booster is in an unsteady state. Therefore, the backup control unit 9c performs the backup control, and communication abnormality histories and a backup control execution history (i.e., concurrent losses of the signals from the respective communication lines L1 and L2) are stored in the communication abnormality storage unit 9a. After that, the ignition is turned off. Next time the ignition is turned on, the driver's pressing of the brake pedal switches on the brake switch 92 but rarely causes a rise of the stroke of the brake pedal BP due to an operation abnormality in the electric booster 5. Further, the communication abnormality histories and the backup control execution history are stored in the communication abnormality storage unit 9a. Accordingly, the booster abnormal state determination unit 9d determines that the electric booster is in an abnormal state. In this manner, even when communication abnormalities occur in the respective communication lines L1 and L2 (even when the signals from the respective communication lines L1 and L2 are lost), even if the booster unsteady state determination unit 9b determines that the electric booster 5 is in a steady state, it is possible to accurately determine that an abnormality occurs in the electric booster 5. Then, the backup control unit 9c performs the backup control according to the determination of the abnormal state, whereby it is possible to reliably obtain a required brake force in the unsteady state.

The brake control apparatus according to the ninth embodiment provides the following effect, in addition to the effects (1), (2), (3), (5), and (6) of the first embodiment.

(14) The brake control apparatus 1 includes the communication abnormality storage unit 9a configured to store losses of the signals from the respective communication lines L1 and L2, the brake switch 92 configured to detect whether the brake pedal BP is operated by the driver, the stroke sensor 7 configured to detect a stroke amount of the brake pedal BP, and the booster abnormal state determination unit 9d configured to determine that the electric booster 5 is in an abnormal state if losses of the signals are stored in the communication abnormality storage unit 9a and the stroke amount does not increase although the brake switch 92 is switched on when the ignition is turned on.

Due to this configuration, it is possible to detect an operation abnormality in the electric booster 5.

Tenth Embodiment

The booster abnormal state determination unit 9d according to a tenth embodiment is different from the second embodiment in terms that it determines that the electric booster 5 is in an abnormal state if the pressing force of the brake pedal BP does not increase although the brake switch 92 is switched on.

Except for that, the tenth embodiment is identically configured to the second embodiment, and therefore the illustration and description thereof are omitted herein.

Next, an operation will be described.

[Booster Abnormal State Determination Operation]

Figure 16:
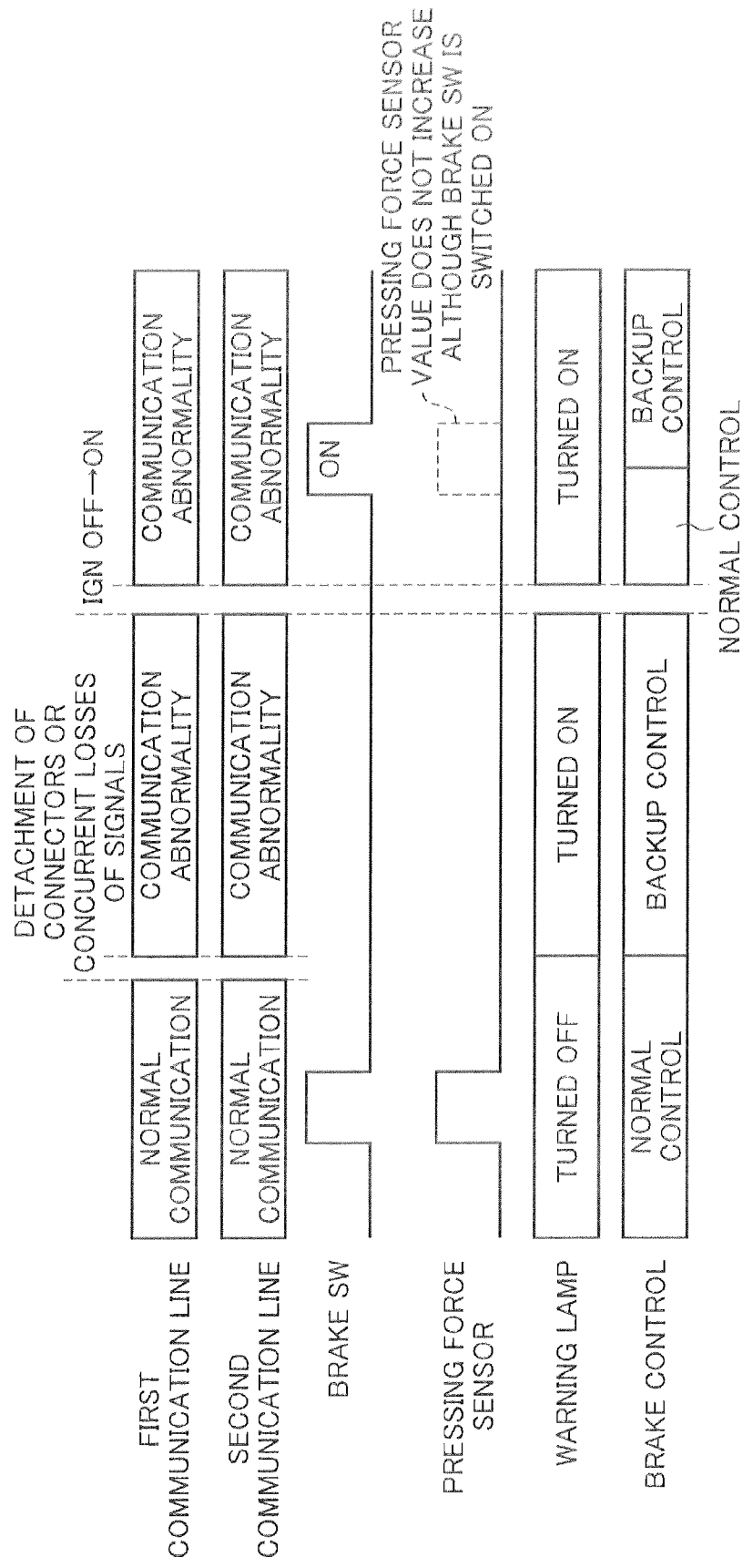
FIG. 16 illustrates a function of determining whether the booster is in an abnormal state according to a tenth embodiment.

FIG. 16 illustrates an operation for determining whether the booster is in an abnormal state according to the tenth embodiment. If communication abnormalities occur in the respective communication lines L1 and L2 due to detachment of the connectors and concurrent losses of the signals, the booster unsteady state determination unit 9b determines that the booster is in an unsteady state. Therefore, the backup control unit 9c performs the backup control. After that, the ignition is turned off. Next time the ignition is turned on, the driver's pressing of the brake pedal switches on the brake switch 92 but rarely causes a rise of the pressing force of the brake pedal BP due to an operation abnormality in the electric booster 5, whereby the booster abnormal state determination unit 9d determines that the electric booster 5 is in an abnormal state. In this manner, even when communication abnormalities occur in the respective communication lines L1 and L2 (the signals from the respective communication lines L1 and L2 are lost concurrently), even if the booster unsteady state determination unit 9b determines that the electric booster 5 is in a steady state, it is possible to accurately determine that an abnormality occurs in the electric booster 5. Then, the backup control unit 9c performs the backup control according to the determination of the abnormal state, whereby it is possible to reliably obtain a required brake force in the unsteady state.

The brake control apparatus according to the tenth embodiment provides the following effect, in addition to the effects (1), (2), (3), (5), and (6) of the first embodiment.

(15) The brake control apparatus includes the brake switch 92 configured to detect whether is operated by the driver the brake pedal BP, the pedal pressing force sensor 93 configured to detect a pedal pressing force applied on the brake pedal BP, and the booster abnormal state determination unit 9d configured to determine that the electric booster 5 is in an abnormal state if the pressing force of the brake pedal BP does not increase although the brake switch 92 is switched on.

Due to this configuration, it is possible to detect an operation abnormality in the electric booster 5.

Eleventh Embodiment

The booster abnormal state determination unit 9d according to an eleventh embodiment is different from the second embodiment in terms that it determines that the electric booster 5 is in an abnormal state if communication abnormalities and execution of the backup control are stored in the communication abnormality storage unit 9a and the pressing force of the brake pedal BP does not increase although the brake switch 92 is switched on when the ignition is turned on.

Except for that, the eleventh embodiment is identically configured to the second embodiment, and therefore the illustration and description thereof are omitted herein.

Next, an operation will be described.

[Booster Abnormal State Determination Operation]

Figure 17:
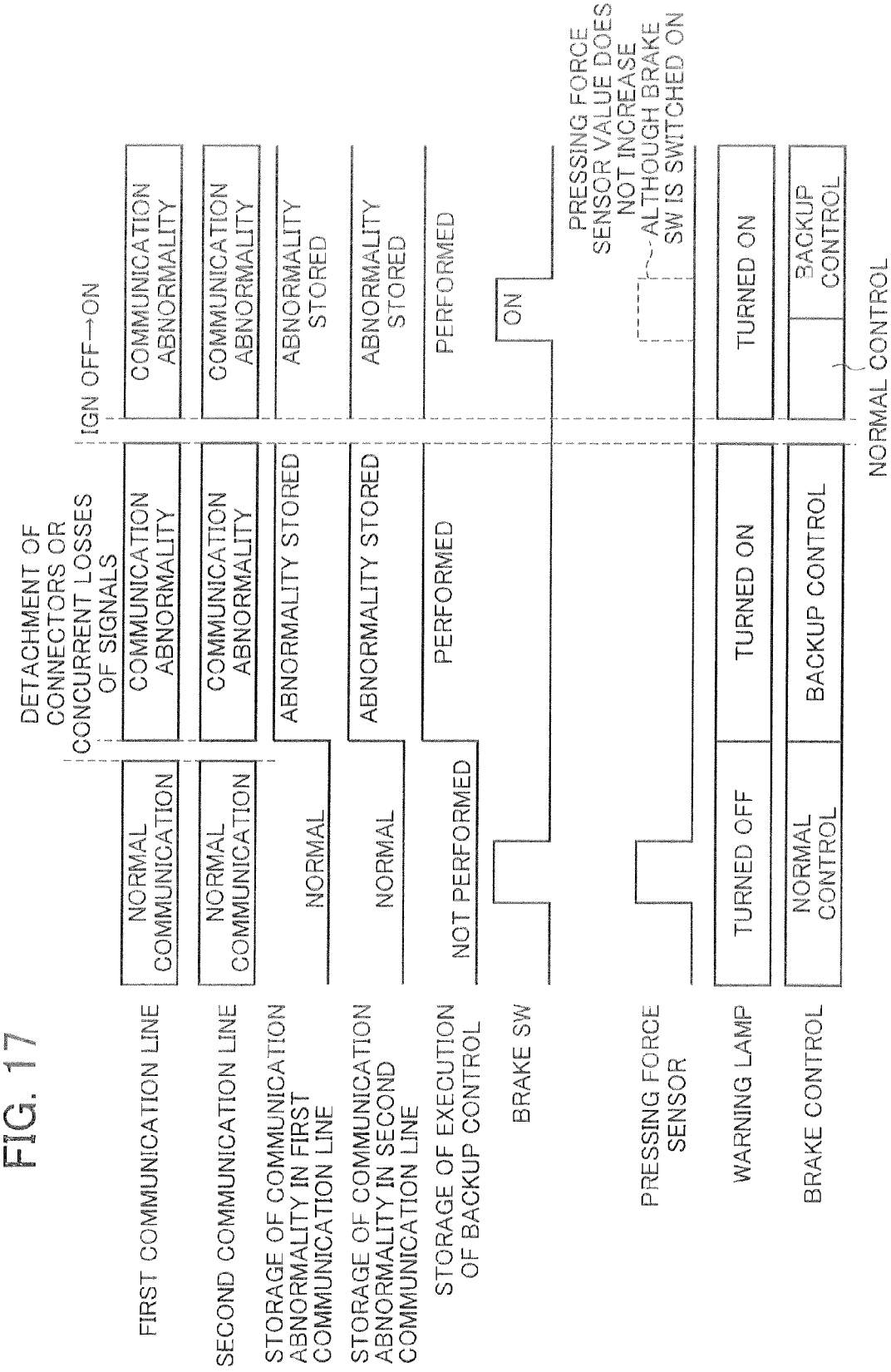
FIG. 17 illustrates a function of determining whether the booster is in an abnormal state according to an eleventh embodiment.

FIG. 17 illustrates an operation for determining whether the booster is in an abnormal state according to the eleventh embodiment. If communication abnormalities occur in the respective communication lines L1 and L2 due to detachment of the connectors or concurrent losses of the signals, the booster unsteady state determination unit 9b determines that the booster is in an unsteady state, and the backup control unit 9c performs the backup control. Communication abnormality histories and a backup control execution history (i.e., concurrent losses of the signals from the respective communication lines L1 and L2) are stored in the communication abnormality storage unit 9a. After that, the ignition is turned off. Next time the ignition is turned on, the driver's pressing of the brake pedal switches on the brake switch 92 but rarely causes a rise of the pressing force of the brake pedal BP due to an operation abnormality in the electric booster 5. Further, the communication abnormality histories and the backup control execution history are stored in the communication abnormality storage unit 9a. Accordingly, the booster abnormal state determination unit 9d determines that the electric booster is in an abnormal state. In this manner, even when communication abnormalities occur in the respective communication lines L1 and L2 (the signals from the respective communication lines L1 and L2 are lost concurrently), even if the booster unsteady state determination unit 9b determines that the electric booster 5 is in a steady state, it is possible to accurately determine that an abnormality occurs in the electric booster 5. Then, the backup control unit 9c performs the backup control according to the determination of the abnormal state, whereby it is possible to reliably obtain a required brake force in the unsteady state.

The brake control apparatus according to the eleventh embodiment provides the following effect, in addition to the effects (1), (2), (3), (5), and (6) of the first embodiment.

(16) The brake control apparatus 1 includes the brake switch 92 configured to detect whether the brake pedal BP is operated by the driver, the pedal pressing force sensor 93 configured to detect a pedal pressing force applied on the brake pedal BP, the communication abnormality storage unit 9a configured to store losses of the signals from the respective communication lines L1 and L2, and the booster abnormal state determination unit 9d configured to determine that the electric booster 5 is in an abnormal state if losses of the signals are stored in the communication abnormality storage unit 9a, and the pressing force on the brake pedal BP does not increase although the brake switch 92 is switched on when the ignition is turned on.

Due to this configuration, it is possible to reliably determine whether an operation abnormality occurs in the electric booster 5.

Twelfth Embodiment

The booster abnormal state determination unit 9d according to a twelfth embodiment is different from the second embodiment in terms that it determines that the electric booster 5 is in an abnormal state if a longitudinal G does not indicates an acceleration to a speed reduction side although the brake switch 92 is switched on while the vehicle is running.

Except for that, the twelfth embodiment is identically configured to the second embodiment, and therefore the illustration and description thereof are omitted herein.

Next, an operation will be described.

[Booster Abnormal State Determination Operation]

Figure 18:
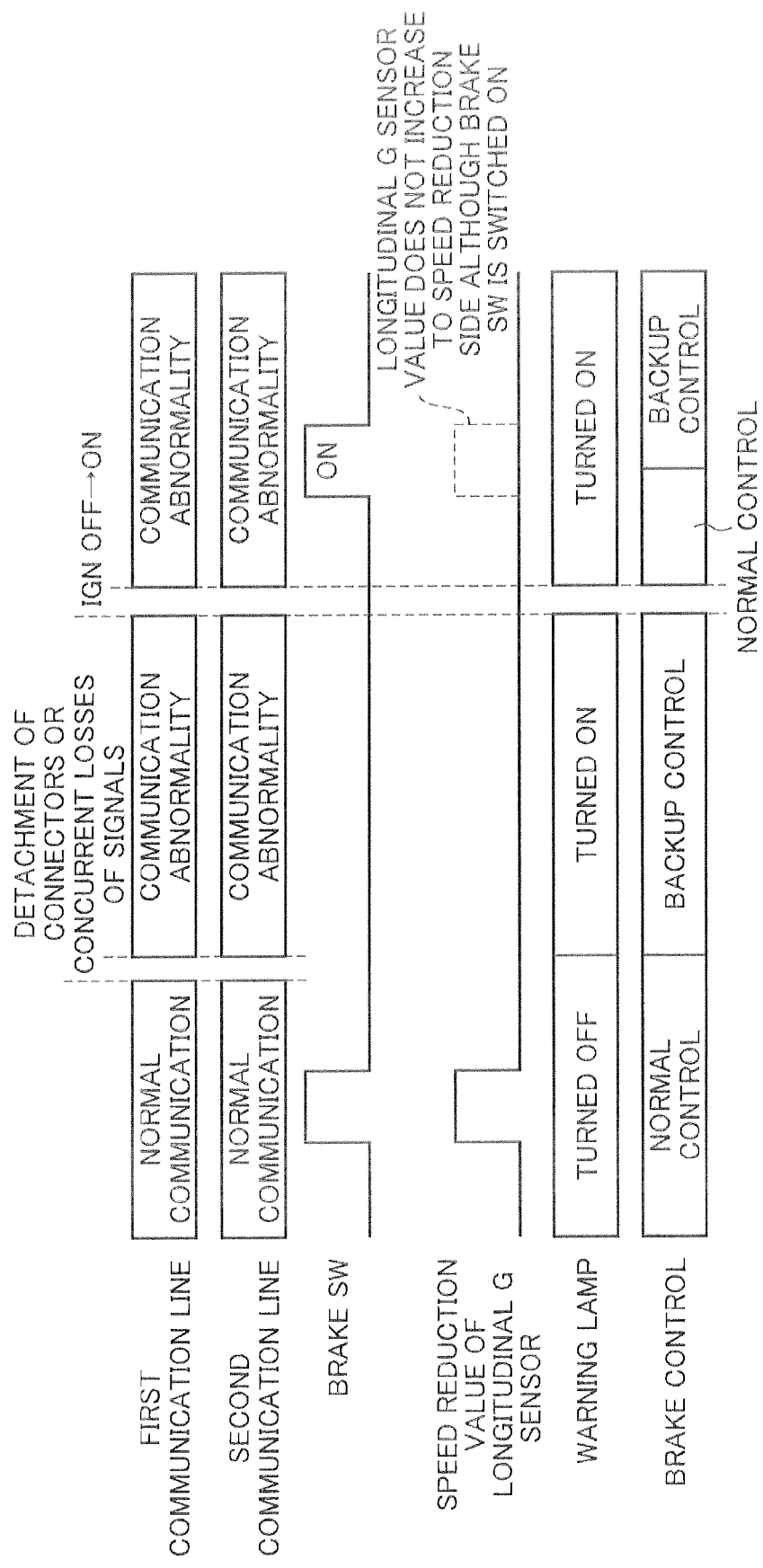
FIG. 18 illustrates a function of determining whether the booster is in an abnormal state according to a twelfth embodiment.

FIG. 18 illustrates an operation for determining whether the booster is in an abnormal state according to the twelfth embodiment. If communication abnormalities occur in the respective communication lines L1 and L2 due to detachment of the connectors or concurrent losses of the signals, the booster unsteady state determination unit 9b determines that the booster is in an unsteady state, and the backup control unit 9c performs the backup control. After that, the ignition is turned off. Next time the ignition is turned on, the driver's pressing of the brake pedal switches on the brake switch 92 but rarely causes a rise of the longitudinal G to the speed reduction side, which is detected by the longitudinal G sensor 94, due to an operation abnormality in the electric booster 5, whereby the booster abnormal state determination unit 9d determines that the electric booster 5 is in an abnormal state. In this manner, even when communication abnormalities occur in the respective communication lines L1 and L2 (even when the signals from the respective communication lines L1 and L2 are lost concurrently), even if the booster unsteady state determination unit 9b determines that the electric booster 5 is in a steady state, it is possible to accurately determine that an abnormality occurs in the electric booster 5. Then, the backup control unit 9c performs the backup control according to the determination of the abnormal state, whereby it is possible to reliably obtain a required brake force in the unsteady state.

The brake control apparatus according to the twelfth embodiment provides the following effect, in addition to the effects (1), (2), (3), (5), and (6) of the first embodiment.

(17) The brake control apparatus 1 includes the brake switch 92 configured to detect whether the brake pedal BP is operated by the driver, the longitudinal G sensor 94 configured to detect a longitudinal G applied on the vehicle, and the booster abnormal state determination unit 9d configured to determine that the electric booster 5 is in an abnormal state if the longitudinal G sensor does not indicate an acceleration to the speed reduction side although the brake switch 92 is switched on while the vehicle is running, even if the booster unsteady state determination unit 9b determines that the electric booster 5 is in a steady state.

Due to this configuration, it is possible to detect an operation abnormality in the electric booster 5.

Thirteenth Embodiment

The booster abnormal state determination unit 9d according to a thirteenth embodiment is different from the second embodiment in terms that it determines that the electric booster 5 is in an abnormal state if communication abnormalities and execution of the backup control are stored in the communication abnormality storage unit 9a and the longitudinal G sensor does not indicate an acceleration to the speed reduction side although the brake switch 92 is switched on while the vehicle is running, when the ignition is turned on.

Except for that, the thirteenth embodiment is identically configured to the second embodiment, and therefore the illustration and description thereof are omitted herein.

Next, an operation will be described.

[Booster Abnormal State Determination Operation]

Figure 19:
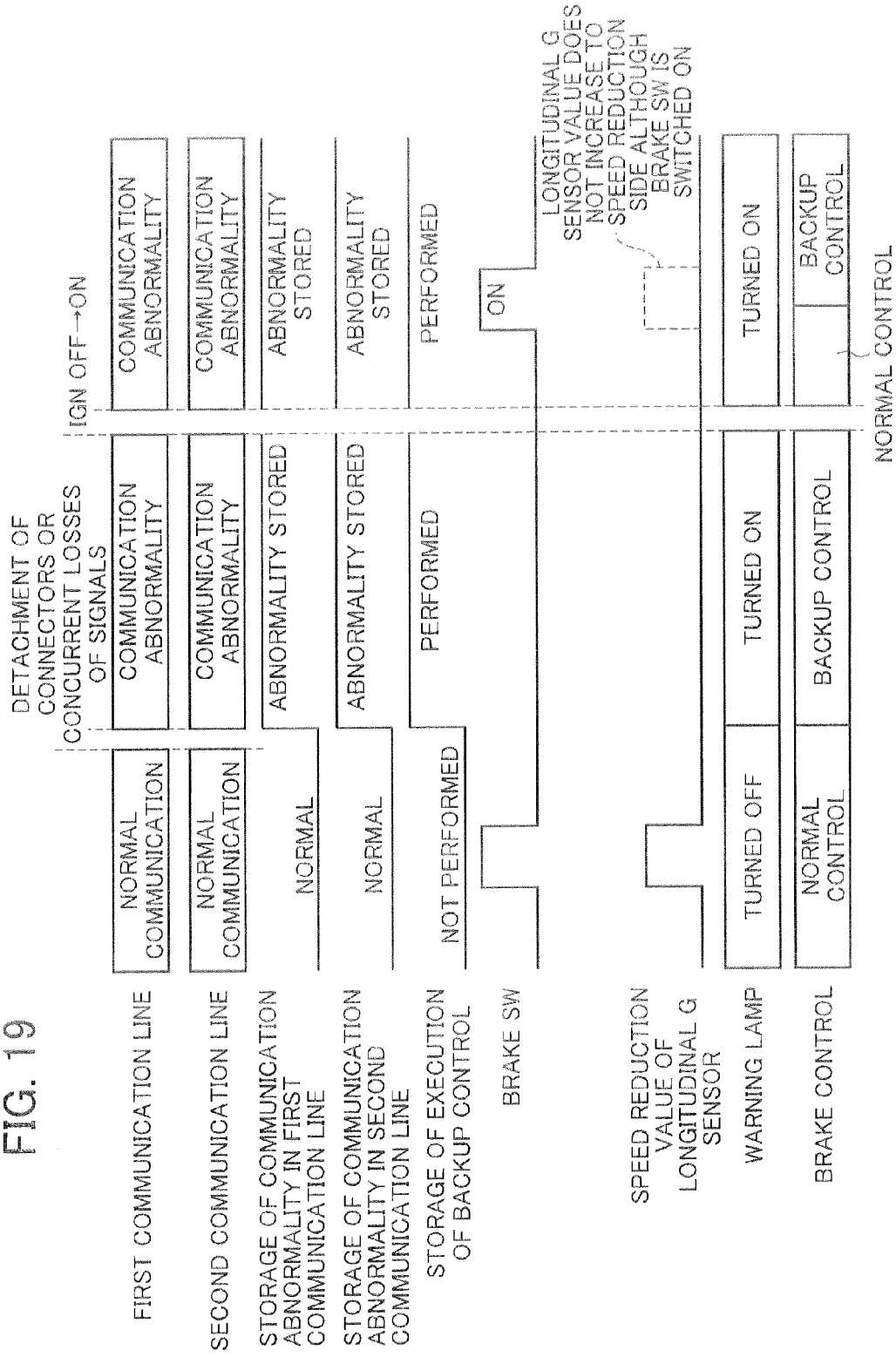
FIG. 19 illustrates a function of determining whether the booster is in an abnormal state according to a thirteenth embodiment.

FIG. 19 illustrates an operation for determining whether the booster is in an abnormal state according to the thirteenth embodiment. If communication abnormalities occur in the respective communication lines L1 and L2 due to detachment of the connectors and concurrent losses of the signals, the booster unsteady state determination unit 9b determines that the booster is in an unsteady state, and the backup control unit 9c performs the backup control. Communication abnormality histories and a backup control execution history (i.e., concurrent losses of the signals from the respective communication lines) are stored in the communication abnormality storage unit 9a. After that, the ignition is turned off. Next time the ignition is turned on, the driver's pressing of the brake pedal switches on the brake switch 92 but rarely causes a rise of the longitudinal G to the speed reduction side, which is detected by the longitudinal G sensor 94, due to an operation abnormality in the electric booster 5. Further, the communication abnormality histories and the backup control execution history are stored in the communication abnormality storage unit 9a. Accordingly, the booster abnormal state determination unit 9d determines that the electric booster 5 is in an abnormal state. In this manner, even when communication abnormalities occur in the respective communication lines L1 and L2 (the signals from the respective communication lines L1 and L2 are lost concurrently), even if the booster unsteady state determination unit 9b determines that the electric booster 5 is in a steady state, it is possible to accurately determine that an abnormality occurs in the electric booster 5. Then, the backup control unit 9c performs the backup control according to the determination of the abnormal state, whereby it is possible to reliably obtain a required brake force in the unsteady state.

The brake control apparatus according to the thirteenth embodiment provides the following effect, in addition to the effects (1), (2), (3), (5), and (6) of the first embodiment.

(18) The brake control apparatus 1 includes the brake switch 92 configured to detect whether the brake pedal BP is operated by the driver, the longitudinal G sensor 94 configured to detect a longitudinal G applied on the vehicle, the communication abnormality storage unit 9a configured to store losses of the signals from the respective communication lines L1 and L2, and the booster abnormal state determination unit 9d configured to determine that the electric booster 5 is in an abnormal state if losses of the signals are stored in the communication abnormality storage unit 9a, and the longitudinal G sensor does not indicate an acceleration to the speed reduction side although the brake switch 92 is switched on while the vehicle is running, when the ignition is turned on.

Due to this configuration, it is possible to detect an operation abnormality in the electric booster 5.

Fourteenth Embodiment

Figure 20:
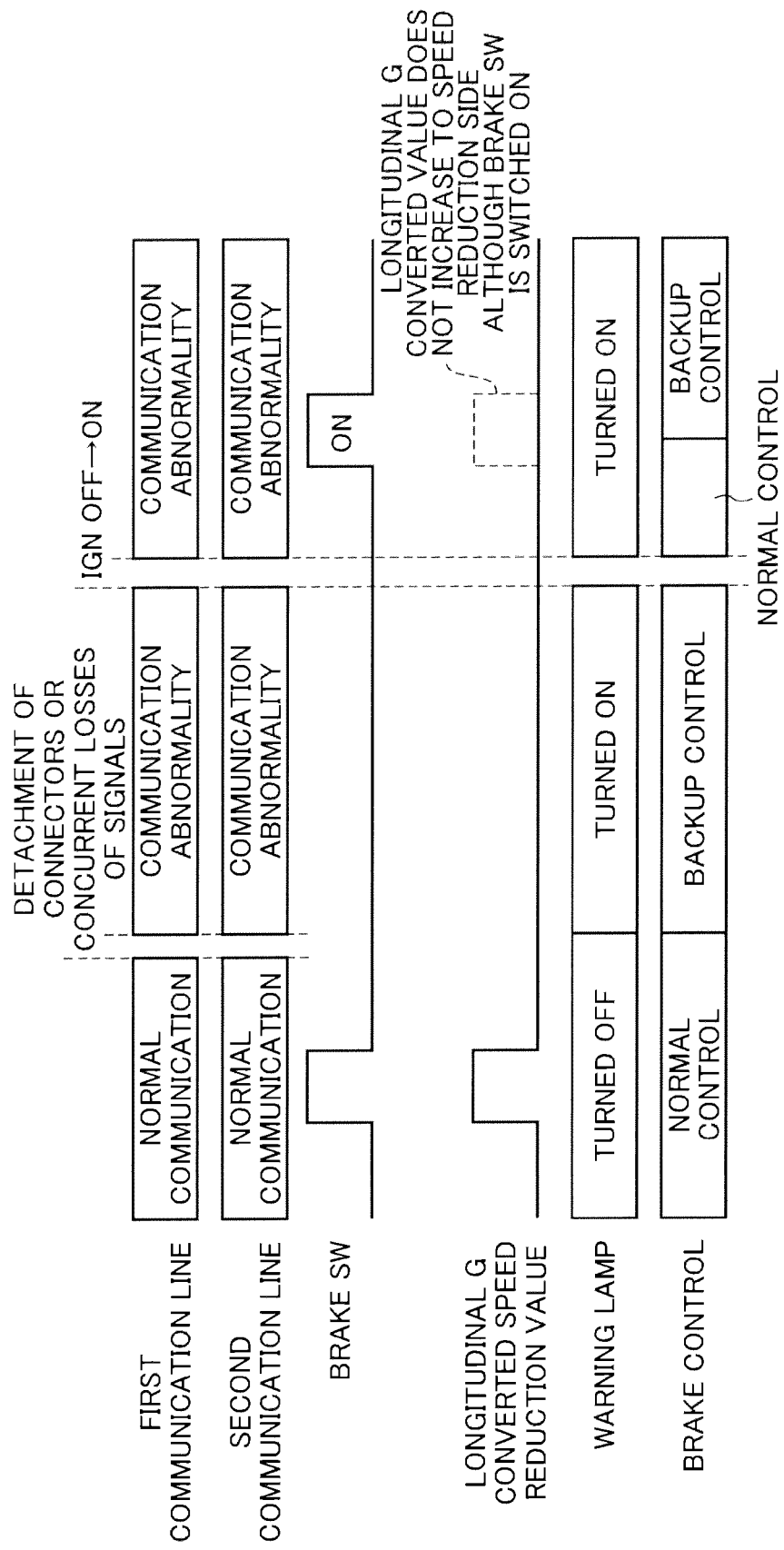
FIG. 20 illustrates a function of determining whether the booster is in an abnormal state according to a fourteenth embodiment.

FIG. 20 illustrates an operation for determining whether the booster is in an abnormal state according to the fourteenth embodiment. The booster abnormal state determination unit 9d according to the fourteenth embodiment is different from the twelfth embodiment in terms that it calculates a longitudinal G converted value from the respective wheel speeds detected by the wheel speed sensors 95a to 95d, and determines that the electric booster 5 is in an abnormal state if the longitudinal G converted value does not indicate an acceleration to the speed reduction side although the brake switch 92 is switched on while the vehicle is running.

Therefore, the brake control apparatus according to the fourteenth embodiment provides the same effects as the twelfth embodiment.

Further, similarly, in the thirteenth embodiment, a longitudinal G converted value calculated from the respective wheel speeds detected by the wheel speed sensors 95a to 95d may be used instead of the detection value of the longitudinal acceleration sensor.

(a) According to one embodiment of the present invention, a brake control apparatus comprises a booster configured to increase an operation force exerted by a driver on a brake operation member to generate a hydraulic pressure in a master cylinder to generate a hydraulic pressure in a wheel cylinder, a hydraulic control device configured to control the hydraulic pressure in the wheel cylinder to which the hydraulic pressure from the master cylinder is supplied, a hydraulic controller configured to control the hydraulic control device, a first communication line configured to be used to transmit the signal to the hydraulic controller, a second communication line arranged in parallel with the first communication line and configured to be used to transmit the signal to the hydraulic controller, and a booster unsteady state determination unit provided in the hydraulic controller and configured to determine whether the booster is in an unsteady state based on communication states of the signals transmitted via the first communication line and the second communication line.

Due to this configuration, it is possible to improve the accuracy for determining whether the booster is in the unsteady state.

(b) In the brake control apparatus, the booster unsteady state determination unit may determine that the booster is in the unsteady state if the signals from the respective communication lines are lost concurrently.

Due to this configuration, it is possible to accurately determine whether the booster is in the unsteady state.

(c) In the brake control apparatus, the hydraulic controller may include a backup control unit configured to control the hydraulic pressure in the wheel cylinder according to a driver's brake operation amount with use of the hydraulic control device if the booster unsteady state determination unit determines that the booster is in the unsteady state.

Due to this configuration, it is possible to reliably obtain a required brake force in the unsteady state.

(d) The brake control apparatus may further comprise a communication abnormality storage unit configured to store losses of the signals from the respective communication lines. The booster unsteady state determination unit may determine that the booster is in the unsteady state if the losses of the signals are stored in the communication abnormality storage unit when an ignition is turned on.

Due to this configuration, it is possible to prevent a false operation by holding a previous state.

(e) The brake control apparatus may be configured to be able to receive signals from a brake switch configured to detect whether the brake operation member is operated, and a master cylinder hydraulic detection unit configured to detect the hydraulic pressure in the master cylinder. The brake control apparatus may further comprise a booster abnormal state determination unit configured to determine that the booster is in an abnormal state if the brake switch is switched on but the detected hydraulic pressure in the master cylinder does not increase, even if the booster unsteady state determination unit determines that the booster is in a steady state.

Due to this configuration, it is possible to detect an operation abnormality in the booster.

(f) The brake control apparatus may be configured to be able to receive signals from a brake switch configured to detect whether the brake operation member is operated by the driver, and a master cylinder hydraulic detection unit configured to detect the hydraulic pressure in the master cylinder. The brake control apparatus may further comprise a communication abnormality storage unit configured to store losses of the signals from the respective communication lines, and a booster abnormal state determination unit configured to determine that the booster is in an abnormal state if the losses of the signals are stored in the communication abnormality storage unit and the detected hydraulic pressure in the master cylinder does not increase although the brake switch is switched on when an ignition is turned on.

Due to this configuration, it is possible to reliably determine whether an operation abnormality occurs in the booster.

(g) The brake control apparatus may be configured to be able to receive signals from a stroke detection unit configured to detect a stroke amount of the brake operation member and a master cylinder hydraulic detection unit configured to detect the hydraulic pressure in the master cylinder. The brake control apparatus may further comprise a booster abnormal state determination unit configured to determine that the booster is in an abnormal state if the detected hydraulic pressure in the master cylinder does not increase although a stroke is detected by the stroke detection unit, even if the booster unsteady state determination unit determines that the booster is in a steady state.

Due to this configuration, it is possible to detect an operation abnormality in the booster (h) The brake control apparatus may be configured to be able to receive signals from a stroke detection unit configured to detect a stroke amount of the brake operation member and a master cylinder hydraulic detection unit configured to detect the hydraulic pressure in the master cylinder. The brake control apparatus may further comprise a communication abnormality storage unit configured to store losses of the signals from the respective communication lines, and a booster abnormal state determination unit configured to determine that the booster is in an abnormal state if the losses of the signals are stored in the communication abnormality storage unit and the detected hydraulic pressure in the master cylinder does not increase although the stroke amount is detected when an ignition is turned on.

Due to this configuration, it is possible to accurately determine whether an operation abnormality occurs in the booster.

(i) The brake control apparatus may be configured to be able to receive signals from a pressing force detection unit configured to detect a pressing force applied onto the brake operation member and a master cylinder hydraulic detection unit configured to detect the hydraulic pressure in the master cylinder. The brake control apparatus may further comprise a booster abnormal state determination unit configured to determine that the booster is in an abnormal state if the detected hydraulic pressure in the master cylinder does not increase although the pressing force is detected, even if the booster unsteady state determination unit determines that the booster is in a steady state.

Due to this configuration, it is possible to detect an operation abnormality in the booster.

(j) The brake control apparatus may be configured to be able to receive signals from a pressing force detection unit configured to detect a pressing force applied onto the brake operation member and a master cylinder hydraulic detection unit configured to detect the hydraulic pressure in the master cylinder. The brake control apparatus may further comprise a communication abnormality storage unit configured to store losses of the signals from the respective communication lines, and a booster abnormal state determination unit configured to determine that the booster is in an abnormal state if the losses of the signals are stored in the communication abnormality storage unit and the detected hydraulic pressure in the master cylinder does not increase although the pressing force is detected when an ignition is turned on.

Due to this configuration, it is possible to reliably determine whether an operation abnormality occurs in the booster.

(k) The brake control apparatus may be configured to be able to receive signals from a brake switch configured to detect whether the brake operation member is operated by the driver and a stroke detection unit configured to detect a stroke amount of the brake operation member. The brake control apparatus may further comprise a booster abnormal state determination unit configured to determine that the booster is in an abnormal state if the stroke amount does not increase although the brake switch is switched on, even if the booster unsteady state determination unit determines that the booster is in a steady state.

Due to this configuration, it is possible to detect an operation abnormality in the booster.

(l) The brake control apparatus may be configured to be able to receive signals from a brake switch configured to detect whether the brake operation member is operated by the driver and a stroke detection unit configured to detect a stroke amount of the brake operation member. The brake control apparatus may further comprise a communication abnormality storage unit configured to store losses of the signals from the respective communication lines, and a booster abnormal state determination unit configured to determine that the booster is in an abnormal state if the losses of the signals are stored in the communication abnormality storage unit and the stroke amount does not increase although the brake switch is switched on when an ignition is turned on.

Due to this configuration, it is possible to reliably determine whether an operation abnormality occurs in the booster.

(m) The brake control apparatus may be configured to be able to receive signals from a brake switch configured to detect whether the brake operation member is operated by the driver and a pressing force detection unit configured to detect a pressing force applied onto the brake operation member. The brake control apparatus may further comprise a booster abnormal state determination unit configured to determine that the booster is in an abnormal state if the pressing force does not increase although the brake switch is switched on, even if the booster unsteady state determination unit determines that the booster is in a steady state.

Due to this configuration, it is possible to detect an operation abnormality in the booster.

(n) The brake control apparatus may be configured to be able to receive signals from a brake switch configured to detect whether the brake operation member is operated by the driver and a pressing force detection unit configured to detect a pressing force applied onto the brake operation member. The brake control apparatus may further comprise a communication abnormality storage unit configured to store losses of the signals from the respective communication lines, and a booster abnormal state determination unit configured to determine that the booster is in an abnormal state if the losses of the signals are stored in the communication abnormality storage unit and the pressing force does not increase although the brake switch is switched on when an ignition is turned on.

Due to this configuration, it is possible to reliably determine whether an operation abnormality occurs in the booster.

(o) The brake control apparatus may be configured to be able to receive signals from a brake switch configured to detect whether the brake operation member is operated by the driver and a longitudinal acceleration detection unit configured to detect a longitudinal acceleration affecting a vehicle. The brake control apparatus may further comprise a booster abnormal state determination unit configured to determine that the booster is in an abnormal state if the longitudinal acceleration does not show an acceleration to a speed reduction side although the brake switch is switched on while the vehicle is running, even if the booster unsteady state determination unit determines that the booster is in a steady state.

Due to this configuration, it is possible to detect an operation abnormality in the booster.

(p) The brake control apparatus may be configured to be able to receive signals from a brake switch configured to detect whether the brake operation member is operated by the driver and a longitudinal acceleration detection unit configured to detect a longitudinal acceleration affecting a vehicle. The brake control apparatus may further comprise a communication abnormality storage unit configured to store losses of the signals from the respective communication lines, and a booster abnormal state determination unit configured to determine that the booster is in an abnormal state if the losses of the signals are stored in the communication abnormality storage unit and the longitudinal acceleration does not show an acceleration to a speed reduction side although the brake switch is switched on while the vehicle is running when an ignition is turned on.

Due to this configuration, it is possible to reliably determine whether an operation abnormality occurs in the booster.

(q) According to another embodiment of the present invention, a brake control apparatus comprises an electric booster configured to increase an operation force exerted by a driver on a brake operation member to generate a hydraulic pressure in a master cylinder to generate a hydraulic pressure in a wheel cylinder, a booster controller configured to control the electric booster, a booster state detection unit provided in the booster controller and configured to detect an abnormal state of the electric booster and transmit an abnormality detection signal, a hydraulic control device configured to control the hydraulic pressure in the wheel cylinder to which the hydraulic pressure from the master cylinder is supplied;

a hydraulic controller configured to control the hydraulic control device, a first communication line configured to be used to transmit the abnormality detection signal to the hydraulic controller, a second communication line arranged in parallel with the first communication line and configured to be used to transmit the abnormality detection signal to the hydraulic controller, and a booster unsteady state determination unit provided in the hydraulic controller and configured to determine that the electric booster is in an unsteady state if both the abnormality detection signals transmitted via the first communication line and the second communication line indicate the abnormal state of the electric booster. The hydraulic controller includes a backup control unit configured to control the hydraulic pressure in the wheel cylinder according to a driver's brake operation amount with use of the hydraulic control device if the booster unsteady state determination unit determines that the electric booster is in the unsteady state.

Due to this configuration, it is possible to improve the accuracy for determining whether the electric booster is in the unsteady state, and reliably obtain a required brake force in the unsteady state.

(r) In the brake control apparatus, the booster unsteady state determination unit may further determine that the electric booster is in the unsteady state if the signals from the respective communication lines are lost concurrently.

Due to this configuration, it is possible to reliably determine whether an operation abnormality occurs in the booster.

(s) According to still another embodiment of the present invention, a brake control apparatus comprises a booster configured to increase an operation force exerted by a driver on a brake operation member to generate a hydraulic pressure in a master cylinder, a booster controller configured to control the booster, a booster state detection unit configured to detect a state of the booster and transmit a corresponding signal, a hydraulic control device configured to control a hydraulic pressure in a wheel cylinder to which the hydraulic pressure from the master cylinder is supplied;

a hydraulic controller configured to control the hydraulic control device, and redundantly arranged communication lines configured to be used to transmit the signal between the controllers. Whether the booster is in an unsteady state is determined based on communication states of the respective communication lines.

Due to this configuration, it is possible to improve the accuracy for determining whether the booster is in the unsteady state.

(t) In the brake control apparatus, the communication lines may comprise a first communication line configured to be used to transmit the signal to the hydraulic controller, and a second communication line arranged in parallel with the first communication line and configured to be used to transmit the signal to the hydraulic controller. It may be determined that the booster is in the unsteady state if the signals transmitted via the first communication line and the second communication line are lost concurrently.

Due to this configuration, it is possible to reliably determine whether an operation abnormality occurs in the booster.

(u) According to still another embodiment of the present invention, a brake control apparatus is configured to be mounted on a vehicle. The vehicle includes a booster configured to increase an operation force exerted by a driver on a brake operation member to generate a hydraulic pressure in a master cylinder, and a booster state detection unit configured to detect a state of the booster and transmit a corresponding signal. The brake control apparatus comprises a hydraulic control device configured to control a hydraulic pressure in a wheel cylinder to which the hydraulic pressure from the master cylinder is supplied, and a hydraulic controller configured to control the hydraulic control device. The hydraulic controller is configured to receive the signal from the booster state detection unit via each of first and second communication lines arranged in parallel with each other. The hydraulic controller includes a booster unsteady state determination unit configured to determine whether the booster is in an unsteady state based on communication states of the signals received via the first communication line and the second communication line.

Due to this configuration, it is possible to improve the accuracy for determining whether the booster is in the unsteady state.

(v) According to still another embodiment of the present invention, a brake control apparatus is configured to be mounted on a vehicle. The vehicle includes an electric booster configured to increase an operation force exerted by a driver on a brake operation member to generate a hydraulic pressure in a master cylinder, a booster controller configured to control the electric booster, and a booster state detection unit provided in the booster controller and configured to detect an abnormal state of the electric booster and transmit an abnormality detection signal. The brake control apparatus comprises a hydraulic control device configured to control a hydraulic pressure in a wheel cylinder to which the hydraulic pressure from the master cylinder is supplied, and a hydraulic controller configured to control the hydraulic control device. The hydraulic controller is configured to receive the abnormality detection signal from the booster state detection unit via each of first and second communication lines. The hydraulic controller includes a booster unsteady state determination unit configured to determine that the electric booster is in an unsteady state if both the abnormality detection signals transmitted via the first communication line and the second communication line indicate an abnormal state of the electric booster. The hydraulic controller comprises a backup control unit configured to control the hydraulic pressure in the wheel cylinder according to a driver's operation amount with use of the hydraulic control device if the booster unsteady state determination unit determines that the booster is in the unsteady state.

Due to this configuration, it is possible to improve the accuracy for determining whether the electric booster is in the unsteady state, and reliably obtain a required brake force in the unsteady state.

(w) According to sill another embodiment of the present invention, a brake control apparatus is configured to be mounted on a vehicle. The vehicle includes a booster configured to increase an operation force exerted by a driver on a brake operation member to generate a hydraulic pressure in a master cylinder, a booster controller configured to control the booster, and a booster state detection unit configured to detect a state of the booster and transmit a corresponding signal. The brake control apparatus comprises a hydraulic control device configured to control a hydraulic pressure in a wheel cylinder to which the hydraulic pressure from the master cylinder is supplied, and a hydraulic controller configured to control the hydraulic control device. The hydraulic controller is configured to receive the signal from the booster state detection unit via each of communication lines redundantly arranged between the controllers, and is configured to determine whether the booster is in an unsteady state based on communication states of the respective communication lines.

Due to this configuration, it is possible to reliably determine whether an operation abnormality occurs in the booster.

The brake control apparatus according to the above-described embodiments can improve the accuracy for determining whether the booster is in the unsteady state.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2013-42514 filed on Mar. 5, 2013. The entire disclosure of No. 2013-42514 filed on Mar. 5, 2013 including specification, claims, drawings and summary is incorporated herein by reference in its entirety.

What is claimed is:

1. A brake control apparatus comprising:
a booster configured to increase an operation force exerted by a driver on a brake operation member to generate a hydraulic pressure in a master cylinder;
a booster state detection unit configured to:
  detect a state of the booster, and
  transmit a corresponding signal;
a hydraulic control device configured to control a hydraulic pressure in a wheel cylinder to which the hydraulic pressure from the master cylinder is supplied;
a hydraulic controller configured to control the hydraulic control device;
a first communication line configured to be used to transmit the signal to the hydraulic controller;
a second communication line arranged in parallel with the first communication line and configured to be used to transmit the signal to the hydraulic controller; and
a booster unsteady state determination unit provided in the hydraulic controller and configured to determine whether the booster is in an unsteady state based on communication states of the signals transmitted via the first communication line and the second communication line.

2. The brake control apparatus according to claim 1, wherein the booster unsteady state determination unit determines that the booster is in the unsteady state if the signals from the respective communication lines are lost concurrently.

3. The brake control apparatus according to claim 2, wherein the hydraulic controller includes a backup control unit configured to control the hydraulic pressure in the wheel cylinder according to a driver's brake operation amount with use of the hydraulic control device if the booster unsteady state determination unit determines that the booster is in the unsteady state.

4. The brake control apparatus according to claim 1, further comprising a communication abnormality storage unit configured to store losses of the signals from the respective communication lines,
wherein the booster unsteady state determination unit determines that the booster is in the unsteady state if the losses of the signals are stored in the communication abnormality storage unit when an ignition is turned on.

5. The brake control apparatus according to claim 1, wherein the brake control apparatus is configured to be able to receive signals from a brake switch configured to detect whether the brake operation member is operated, and a master cylinder hydraulic detection unit configured to detect the hydraulic pressure in the master cylinder, and
wherein the brake control apparatus further comprises a booster abnormal state determination unit configured to determine that the booster is in an abnormal state if the brake switch is switched on but the detected hydraulic pressure in the master cylinder does not increase, even if the booster unsteady state determination unit determines that the booster is in a steady state.

6. The brake control apparatus according to claim 1, wherein the brake control apparatus is configured to be able to receive signals from a brake switch configured to detect whether the brake operation member is operated by the driver, and a master cylinder hydraulic detection unit configured to detect the hydraulic pressure in the master cylinder, and
wherein the brake control apparatus further comprises a communication abnormality storage unit configured to store losses of the signals from the respective communication lines, and a booster abnormal state determination unit configured to determine that the booster is in an abnormal state if the losses of the signals are stored in the communication abnormality storage unit and the detected hydraulic pressure in the master cylinder does not increase although the brake switch is switched on when an ignition is turned on.

7. The brake control apparatus according to claim 1, wherein the brake control apparatus is configured to be able to receive signals from a stroke detection unit configured to detect a stroke amount of the brake operation member and a master cylinder hydraulic detection unit configured to detect the hydraulic pressure in the master cylinder, and
wherein the brake control apparatus further comprises a booster abnormal state determination unit configured to determine that the booster is in an abnormal state if the detected hydraulic pressure in the master cylinder does not increase although a stroke is detected by the stroke detection unit, even if the booster unsteady state determination unit determines that the booster is in a steady state.

8. The brake control apparatus according to claim 1, wherein the brake control apparatus is configured to be able to receive signals from a stroke detection unit configured to detect a stroke amount of the brake operation member and a master cylinder hydraulic detection unit configured to detect the hydraulic pressure in the master cylinder, and
wherein the brake control apparatus further comprises a communication abnormality storage unit configured to store losses of the signals from the respective communication lines, and a booster abnormal state determination unit configured to determine that the booster is in an abnormal state if the losses of the signals are stored in the communication abnormality storage unit and the detected hydraulic pressure in the master cylinder does not increase although the stroke amount is detected when an ignition is turned on.

9. The brake control apparatus according to claim 1, wherein the brake control apparatus is configured to be able to receive signals from a pressing force detection unit configured to detect a pressing force applied onto the brake operation member and a master cylinder hydraulic detection unit configured to detect the hydraulic pressure in the master cylinder, and
 wherein the brake control apparatus further comprises a booster abnormal state determination unit configured to determine that the booster is in an abnormal state if the detected hydraulic pressure in the master cylinder does not increase although the pressing force is detected, even if the booster unsteady state determination unit determines that the booster is in a steady state.

10. The brake control apparatus according to claim 1, wherein the brake control apparatus is configured to be able to receive signals from a pressing force detection unit configured to detect a pressing force applied onto the brake operation member and a master cylinder hydraulic detection unit configured to detect the hydraulic pressure in the master cylinder, and
 wherein the brake control apparatus further comprises a communication abnormality storage unit configured to store losses of the signals from the respective communication lines, and a booster abnormal state determination unit configured to determine that the booster is in an abnormal state if the losses of the signals are stored in the communication abnormality storage unit and the detected hydraulic pressure in the master cylinder does not increase although the pressing force is detected when an ignition is turned on.

11. The brake control apparatus according to claim 1, wherein the brake control apparatus is configured to be able to receive signals from a brake switch configured to detect whether the brake operation member is operated by the driver and a stroke detection unit configured to detect a stroke amount of the brake operation member, and
 wherein the brake control apparatus further comprises a booster abnormal state determination unit configured to determine that the booster is in an abnormal state if the stroke amount does not increase although the brake switch is switched on, even if the booster unsteady state determination unit determines that the booster is in a steady state.

12. The brake control apparatus according to claim 1, wherein the brake control apparatus is configured to be able to receive signals from a brake switch configured to detect whether the brake operation member is operated by the driver and a stroke detection unit configured to detect a stroke amount of the brake operation member, and
 wherein the brake control apparatus further comprises a communication abnormality storage unit configured to store losses of the signals from the respective communication lines, and a booster abnormal state determination unit configured to determine that the booster is in an abnormal state if the losses of the signals are stored in the communication abnormality storage unit and the stroke amount does not increase although the brake switch is switched on when an ignition is turned on.

13. The brake control apparatus according to claim 1, wherein the brake control apparatus is configured to be able to receive signals from a brake switch configured to detect whether the brake operation member is operated by the driver and a pressing force detection unit configured to detect a pressing force applied onto the brake operation member, and
 wherein the brake control apparatus further comprises a booster abnormal state determination unit configured to determine that the booster is in an abnormal state if the pressing force does not increase although the brake switch is switched on, even if the booster unsteady state determination unit determines that the booster is in a steady state.

14. The brake control apparatus according to claim 1, wherein the brake control apparatus is configured to be able to receive signals from a brake switch configured to detect whether the brake operation member is operated by the driver and a pressing force detection unit configured to detect a pressing force applied onto the brake operation member, and
 wherein the brake control apparatus further comprises a communication abnormality storage unit configured to store losses of the signals from the respective communication lines, and a booster abnormal state determination unit configured to determine that the booster is in an abnormal state if the losses of the signals are stored in the communication abnormality storage unit and the pressing force does not increase although the brake switch is switched on when an ignition is turned on.

15. The brake control apparatus according to claim 1, wherein the brake control apparatus is configured to be able to receive signals from a brake switch configured to detect whether the brake operation member is operated by the driver and a longitudinal acceleration detection unit configured to detect a longitudinal acceleration affecting a vehicle, and
 wherein the brake control apparatus further comprises a booster abnormal state determination unit configured to determine that the booster is in an abnormal state if the longitudinal acceleration does not show an acceleration to a speed reduction side although the brake switch is switched on while the vehicle is running, even if the booster unsteady state determination unit determines that the booster is in a steady state.

16. The brake control apparatus according to claim 1, wherein the brake control apparatus is configured to be able to receive signals from a brake switch configured to detect whether the brake operation member is operated by the driver and a longitudinal acceleration detection unit configured to detect a longitudinal acceleration affecting a vehicle, and
 wherein the brake control apparatus further comprises a communication abnormality storage unit configured to store losses of the signals from the respective communication lines, and a booster abnormal state determination unit configured to determine that the booster is in an abnormal state if the losses of the signals are stored in the communication abnormality storage unit and the longitudinal acceleration does not show an acceleration to a speed reduction side although the brake switch is switched on while the vehicle is running when an ignition is turned on.

17. A brake control apparatus comprising:
 an electric booster configured to increase an operation force exerted by a driver on a brake operation member to generate a hydraulic pressure in a master cylinder;
 a booster controller configured to control the electric booster;
 a booster state detection unit provided in the booster controller and configured to:
  detect an abnormal state of the electric booster, and
  transmit an abnormality detection signal;
 a hydraulic control device configured to control a hydraulic pressure in a wheel cylinder to which the hydraulic pressure from the master cylinder is supplied;
 a hydraulic controller configured to control the hydraulic control device;

a first communication line configured to be used to transmit the abnormality detection signal to the hydraulic controller;
a second communication line arranged in parallel with the first communication line and configured to be used to transmit the abnormality detection signal to the hydraulic controller; and
a booster unsteady state determination unit provided in the hydraulic controller and configured to determine that the electric booster is in an unsteady state if both the abnormality detection signals transmitted via the first communication line and the second communication line indicate the abnormal state of the electric booster,
wherein the hydraulic controller further includes
a backup control unit configured to control the hydraulic pressure in the wheel cylinder according to a driver's brake operation amount with use of the hydraulic control device having determined from the booster unsteady state determination unit that the electric booster is in the unsteady state.

18. The brake control apparatus according to claim 17, wherein the booster unsteady state determination unit further determines that the electric booster is in the unsteady state if the signals from the respective communication lines are lost concurrently.

19. A brake control apparatus comprising:
a booster configured to increase an operation force exerted by a driver on a brake operation member to generate a hydraulic pressure in a master cylinder;
a booster controller configured to control the booster;
a booster state detection unit configured to:
detect a state of the booster, and
transmit a corresponding signal;
a hydraulic control device configured to control a hydraulic pressure in a wheel cylinder to which the hydraulic pressure from the master cylinder is supplied;
a hydraulic controller configured to control the hydraulic control device; and
at least two redundantly arranged communication lines configured to be used to transmit the signal between the controllers,
wherein the booster is determined to be in an unsteady state based on communication states of the respective communication lines.

20. The brake control apparatus according to claim 19, wherein the communication lines comprise a first communication line configured to be used to transmit the signal to the hydraulic controller, and a second communication line arranged in parallel with the first communication line and configured to be used to transmit the signal to the hydraulic controller, and
wherein it is determined that the booster is in the unsteady state if the signals transmitted via the first communication line and the second communication line are lost concurrently.

21. A brake control apparatus configured to be mounted on a vehicle,
the vehicle including:
a booster configured to increase an operation force exerted by a driver on a brake operation member to generate a hydraulic pressure in a master cylinder, and
a booster state detection unit configured to:
detect a state of the booster, and
transmit a corresponding signal,
the brake control apparatus comprising:
a hydraulic control device configured to control a hydraulic pressure in a wheel cylinder to which the hydraulic pressure from the master cylinder is supplied; and
a hydraulic controller configured to control the hydraulic control device,
wherein the hydraulic controller is configured to receive the signal from the booster state detection unit via each of first and second communication lines arranged in parallel with each other, and
wherein the hydraulic controller further includes a booster unsteady state determination unit configured to determine whether the booster is in an unsteady state based on communication states of the signals received via the first communication line and the second communication line.

22. A brake control apparatus configured to be mounted on a vehicle,
the vehicle including:
an electric booster configured to increase an operation force exerted by a driver on a brake operation member to generate a hydraulic pressure in a master cylinder,
a booster controller configured to control the electric booster, and
a booster state detection unit provided in the booster controller and configured to:
detect an abnormal state of the electric booster, and
transmit an abnormality detection signal,
the brake control apparatus comprising:
a hydraulic control device configured to control a hydraulic pressure in a wheel cylinder to which the hydraulic pressure from the master cylinder is supplied; and
a hydraulic controller configured to:
control the hydraulic control device, and
receive the abnormality detection signal from the booster state detection unit via each of first and second communication lines,
wherein the hydraulic controller further comprises:
a booster unsteady state determination unit configured to determine that the electric booster is in an unsteady state if both the abnormality detection signals transmitted via the first communication line and the second communication line indicate an abnormal state of the electric booster; and
a backup control unit configured to control the hydraulic pressure in the wheel cylinder according to a driver's operation amount with use of the hydraulic control device having determined from the booster unsteady state determination unit that the booster is in the unsteady state.

23. A brake control apparatus configured to be mounted on a vehicle,
the vehicle including:
a booster configured to increase an operation force exerted by a driver on a brake operation member to generate a hydraulic pressure in a master cylinder,
a booster controller configured to control the booster, and
a booster state detection unit configured to:
detect a state of the booster, and
transmit a corresponding signal, the brake control apparatus comprising:
- a hydraulic control device configured to control a hydraulic pressure in a wheel cylinder to which the hydraulic pressure from the master cylinder is supplied; and
- a hydraulic controller configured to:
  - control the hydraulic control device,
  - receive the signal from the booster state detection unit via each of communication lines redundantly arranged between the controllers, and
  - determine whether the booster is in an unsteady state based on communication states of the respective communication lines.

* * * * *